(12) United States Patent
Kimura

(10) Patent No.: US 10,670,834 B2
(45) Date of Patent: Jun. 2, 2020

(54) ZOOM LENS AND IMAGE PICKUP APPARATUS

(71) Applicant: CANON KABUSHIKI KAISHA, Tokyo (JP)

(72) Inventor: Kohei Kimura, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 111 days.

(21) Appl. No.: 16/125,152

(22) Filed: Sep. 7, 2018

(65) Prior Publication Data

US 2019/0079269 A1 Mar. 14, 2019

(30) Foreign Application Priority Data

Sep. 11, 2017 (JP) ................. 2017-173820

(51) Int. Cl.
*G02B 9/60* (2006.01)
*G02B 9/64* (2006.01)
*G02B 13/06* (2006.01)
*G02B 7/04* (2006.01)
*H04N 5/232* (2006.01)
*G02B 13/02* (2006.01)
*G02B 15/17* (2006.01)

(52) U.S. Cl.
CPC ............... *G02B 9/64* (2013.01); *G02B 7/04* (2013.01); *G02B 13/02* (2013.01); *G02B 13/06* (2013.01); *G02B 15/17* (2013.01); *H04N 5/23248* (2013.01)

(58) Field of Classification Search
CPC .......... G02B 9/64; G02B 15/17; G02B 13/02; G02B 7/04; G02B 13/06
See application file for complete search history.

(56) References Cited

U.S. PATENT DOCUMENTS

| 2012/0236419 | A1* | 9/2012 | Atsuumi | G02B 15/17 359/683 |
| 2015/0177498 | A1 | 6/2015 | Iwasawa | |
| 2018/0039051 | A1 | 2/2018 | Kimura | |
| 2018/0074300 | A1 | 3/2018 | Gyoda et al. | |

FOREIGN PATENT DOCUMENTS

JP 2016197257 A 11/2016

* cited by examiner

*Primary Examiner* — Joseph P Martinez
(74) *Attorney, Agent, or Firm* — Carter, DeLuca & Farrell LLP

(57) ABSTRACT

Provided is a zoom lens including a plurality of lens units, in which an interval between each pair of adjacent lens units is changed during zooming. The plurality of lens units consist of, in order from an object side to an image side: a first lens unit having a positive refractive power; a second lens unit having a negative refractive power; a third lens unit having a negative refractive power; and a rear lens group including at least one lens unit. An interval between the second lens unit and the third lens unit becomes larger at a telephoto end than at a wide angle end. The third lens unit is moved during focusing. Focal lengths of the second lens unit and the third lens unit, a focal length of the zoom lens at the wide angle end, and a back focus at the wide angle end are appropriately set.

14 Claims, 11 Drawing Sheets

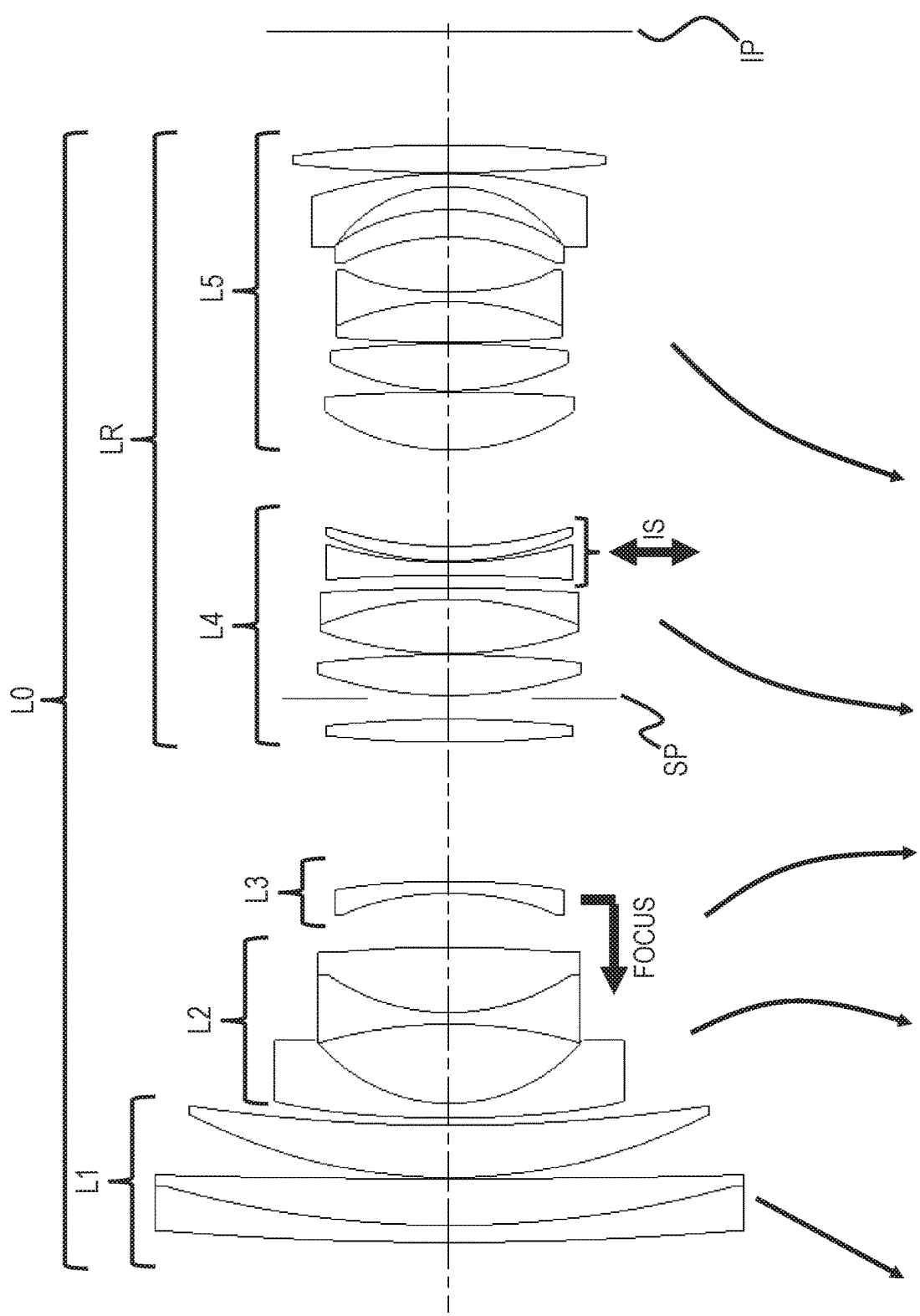

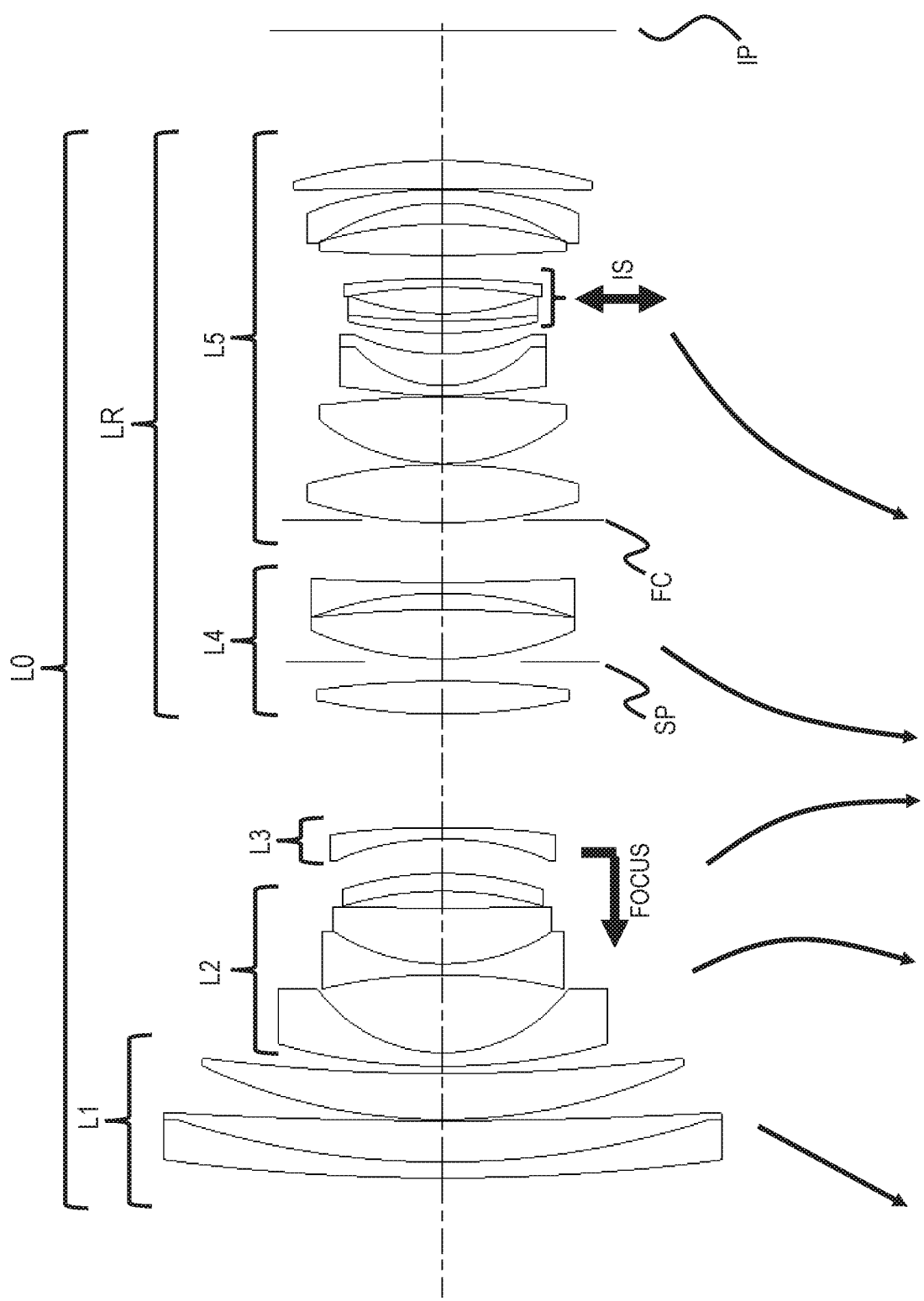

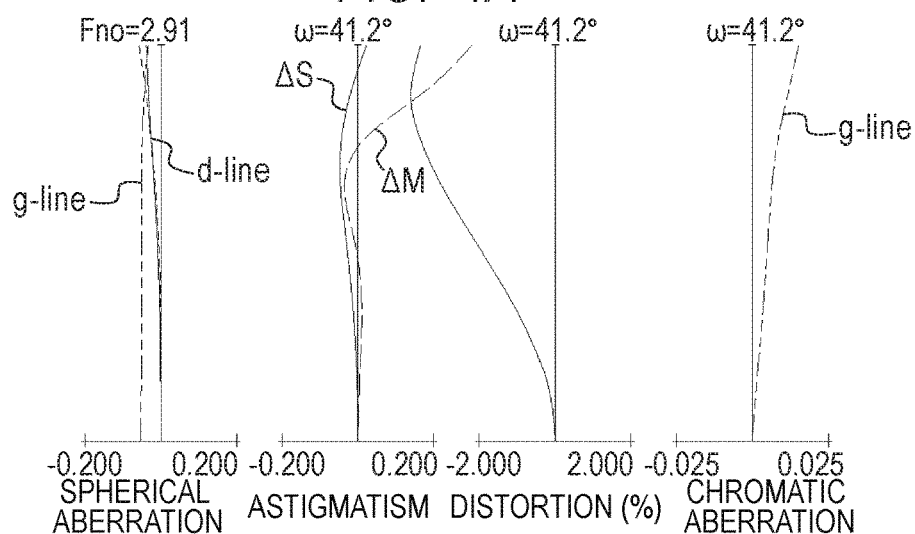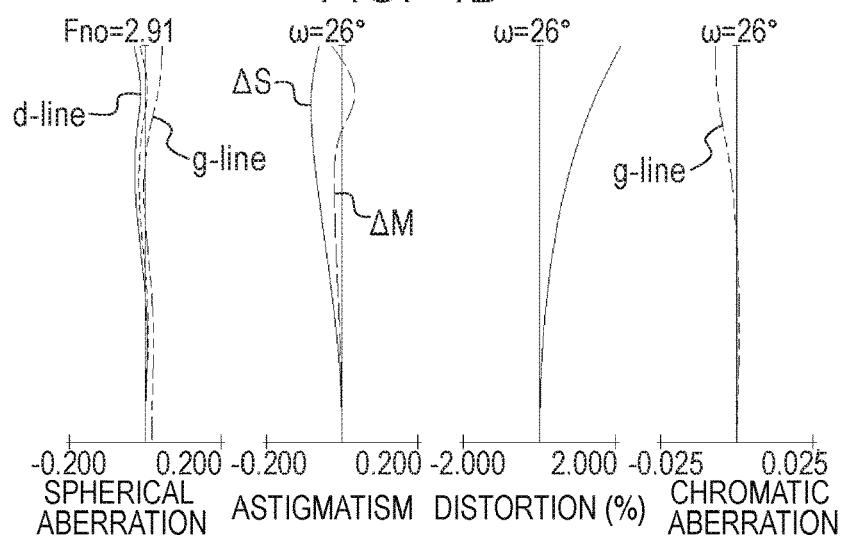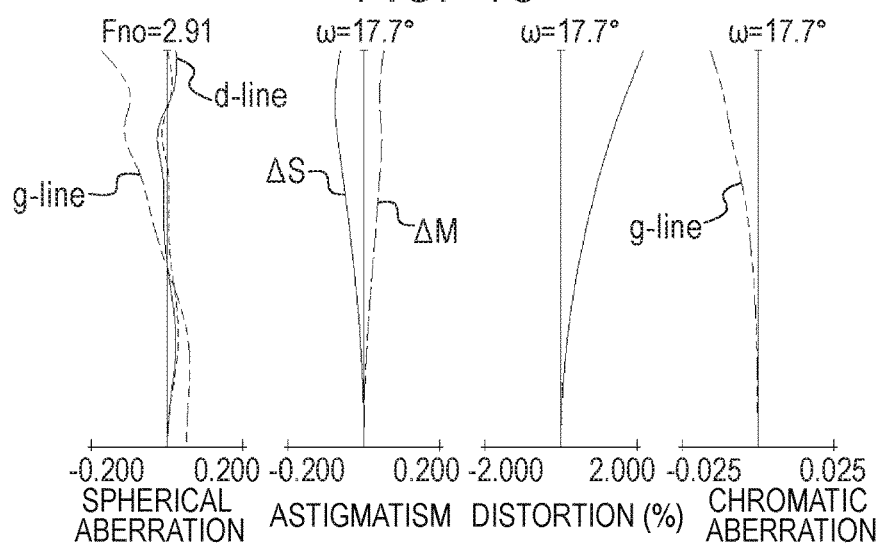

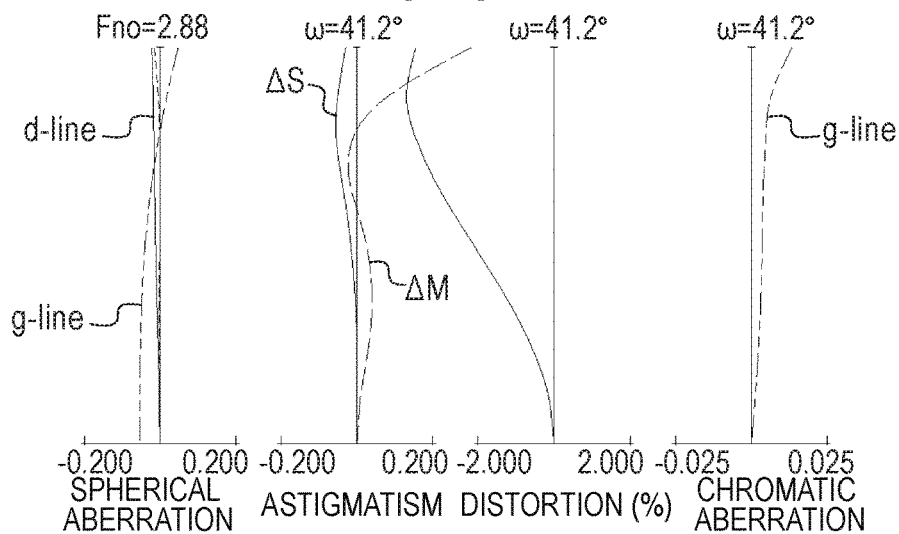
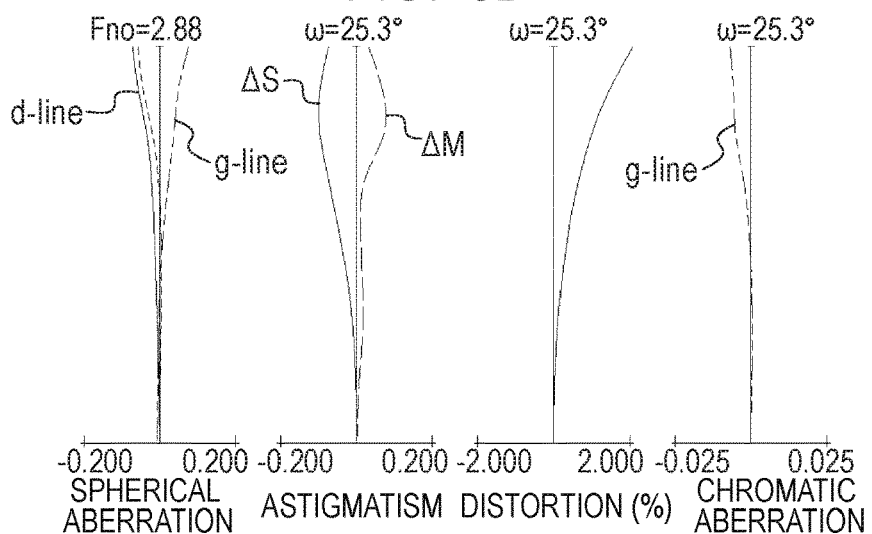
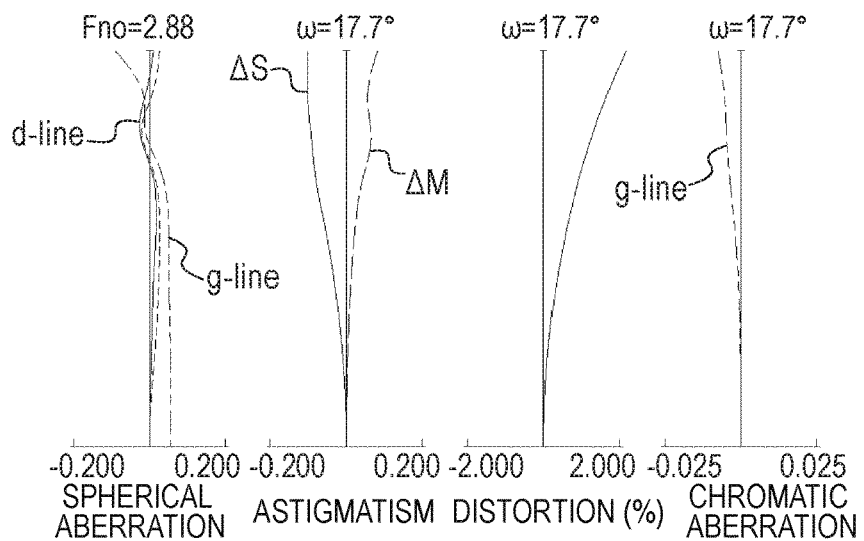

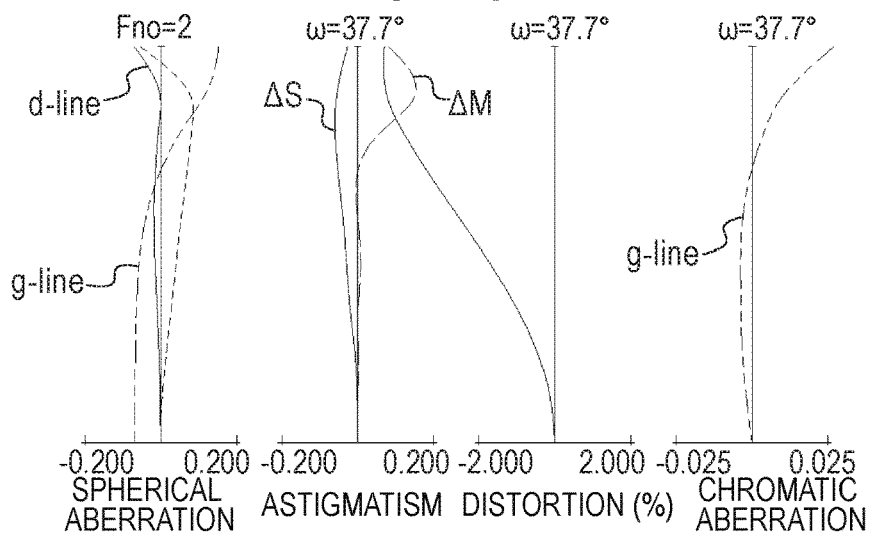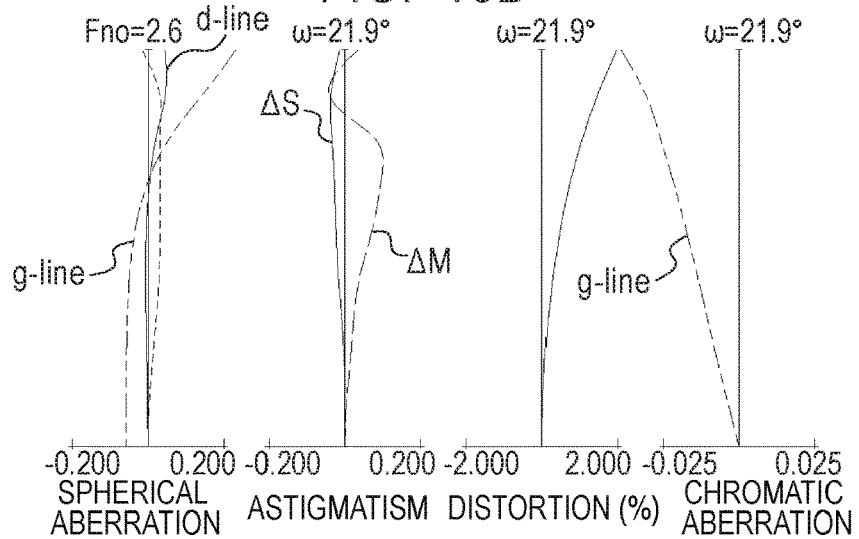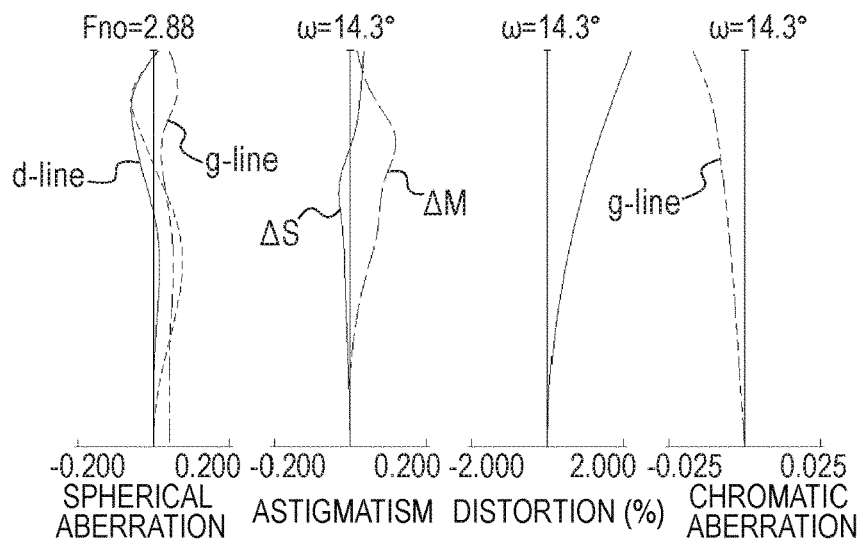

ZOOM LENS AND IMAGE PICKUP APPARATUS

BACKGROUND OF THE INVENTION

Field of the Invention

The present invention relates to a zoom lens and an image pickup apparatus. For example, the zoom lens is suitable for an image pickup optical system for use with a digital still camera, a video camera, a monitoring camera, a broadcasting camera, or other such image pickup apparatus.

Description of the Related Art

In recent years, an image pickup apparatus using an image pickup element is enhanced in functionality, and is downsized as an entire apparatus. It is desired that an image pickup optical system for use with the image pickup apparatus be a zoom lens that has a bright f-number, a short total lens length, a small lens barrel diameter, and a high resolution over the entire zoom range. In recent years, it is also required that, for example, a focusing speed be high, a variation in optical performance be small during focusing, and a change in image magnification be small during focusing.

In recent years, there has been proposed an image pickup optical system of a so-called mirrorless type having a back focus set short and a mechanical member omitted from a segment between the last lens surface and an image plane in order to reduce the total lens length and the lens barrel diameter. As a zoom lens easy to shorten in total length and increase in diameter, there has been known a positive-lead type zoom lens, in which a lens unit having a positive refractive power is arranged closest to an object side.

In U.S. Patent Application Publication No. 2015/0177498, there is disclosed a zoom lens consisting of, in order from the object side to an image side, a first lens unit to a sixth lens unit having positive, negative, positive, negative, positive, and negative refractive powers, respectively, in which an interval between each pair of adjacent lens units is changed during zooming and the fourth lens unit is moved during focusing.

As the positive-lead type zoom lens, there has been known a zoom lens of a so-called inner focus type, in which focusing is performed by a lens unit having a negative refractive power on the object side of an aperture stop.

In U.S. Patent Application Publication No. 2012/0236419, there is disclosed a zoom lens consisting of, in order from the object side to the image side, the first lens unit to a fifth lens unit having positive, negative, positive, negative, and positive refractive powers, respectively, and an interval between each pair of adjacent lens units is changed during zooming and the third lens unit is moved during focusing.

A zoom lens to be used for an image pickup apparatus is strongly desired to have a predetermined zoom ratio, be compact as an entire lens system, have a small and lightweight focus lens unit, exhibit a small aberration variation during focusing, and have other such properties.

In the positive-lead type zoom lens, in order to reduce the total lens length and the lens barrel diameter to obtain high focusing performance, it is required to enhance the refractive power of each of the lens units, and appropriately set the focus lens unit. In particular, when a mechanical structure is included in the focus lens unit, a great influence is exerted on the lens barrel diameter. Therefore, it is important to reduce a lens diameter of the focus lens unit and a movement amount of the lens unit due to the focusing.

Particularly in a zoom lens having a large aperture ratio, the arrangement setting of the focus lens unit in an optical axis direction is an important factor for determining the outer diameter and the mass of the zoom lens. With the recent increase in demand for moving image photographing, it is also important to set a focus lens unit so as to reduce a variation in image pickup field of view, namely, a variation in so-called image magnification, due to focusing. When the selection of the focus lens unit is inappropriate, an aberration variation is increased during focusing, and it becomes difficult to obtain satisfactory optical performance over the entire object distance from a long distance to a short distance.

SUMMARY OF THE INVENTION

According to one embodiment of the present invention, there is provided a zoom lens including a plurality of lens units, in which an interval between each pair of adjacent lens units is changed during zooming. The plurality of lens units consist of, in order from an object side to an image side: a first lens unit having a positive refractive power; a second lens unit having a negative refractive power; a third lens unit having a negative refractive power; and a rear lens group including at least one lens unit. An interval between the second lens unit and the third lens unit becomes larger at a telephoto end than at a wide angle end. The third lens unit is moved during focusing. The zoom lens satisfies the following conditional expressions:

$$-7.0 < f3/fw < -1.8;$$

$$0.36 < skw/fw < 1.0;\text{ and}$$

$$1.2 < f3/f2 < 5.0,$$

where f2 represents a focal length of the second lens unit, f3 represents a focal length of the third lens unit, "fw" represents a focal length of the zoom lens at the wide angle end, and "skw" represents a back focus at the wide angle end.

Further features of the present invention will become apparent from the following description of exemplary embodiments with reference to the attached drawings.

BRIEF DESCRIPTION OF THE DRAWINGS

FIG. 1 is a lens cross-sectional view of a zoom lens according to Example 1 of the present invention at a wide angle end.

FIG. 3 is a lens cross-sectional view of a zoom lens according to Example 2 of the present invention at a wide angle end.

FIG. 4A is an aberration diagram of the zoom lens according to Example 2 at the wide angle end.

FIG. 4B is an aberration diagram of the zoom lens according to Example 2 at the intermediate zoom position.

FIG. 4C is an aberration diagram of the zoom lens according to Example 2 at the telephoto end.

FIG. 8A is an aberration diagram of the zoom lens according to Example 4 at the wide angle end.

FIG. 8B is an aberration diagram of the zoom lens according to Example 4 at the intermediate zoom position.

FIG. 8C is an aberration diagram of the zoom lens according to Example 4 at the telephoto end.

FIG. 10A is an aberration diagram of the zoom lens according to Example 5 at the wide angle end.

FIG. 10B is an aberration diagram of the zoom lens according to Example 5 at the intermediate zoom position.

FIG. 10C is an aberration diagram of the zoom lens according to Example 5 at the telephoto end.

DESCRIPTION OF THE EMBODIMENTS

Preferred embodiments of the present invention will now be described in detail in accordance with the accompanying drawings.

Now, exemplary embodiments of the present invention are described with reference to the accompanying drawings. A zoom lens according to one embodiment of the present invention is a zoom lens including a plurality of lens units, in which an interval between each pair of adjacent lens units is changed during zooming. The plurality of lens units consist of, in order from an object side to an image side, a first lens unit having a positive refractive power, a second lens unit having a negative refractive power, a third lens unit having a negative refractive power, and a rear lens group including one or more lens units.

Figure 2A:
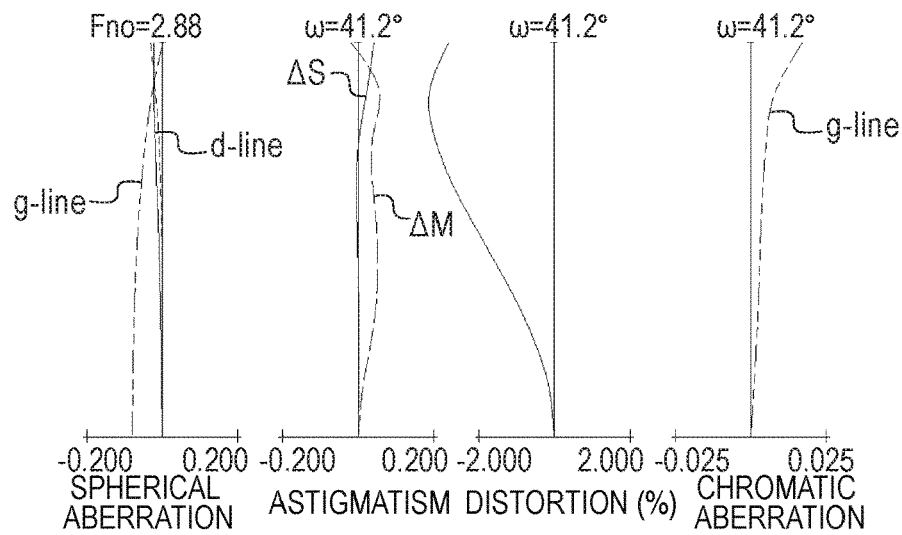
FIG. 2A is an aberration diagram of the zoom lens according to Example 1 at the wide angle end.
Figure 2B:
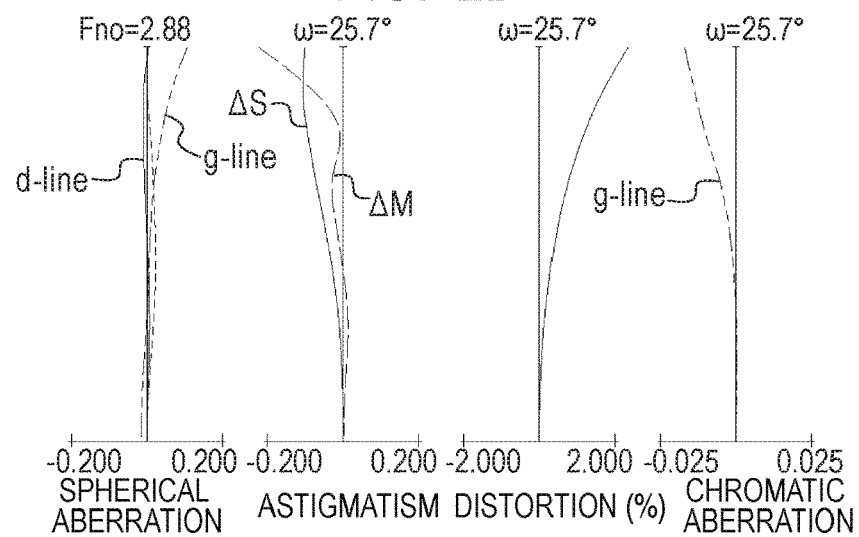
FIG. 2B is an aberration diagram of the zoom lens according to Example 1 at an intermediate zoom position.
Figure 2C:
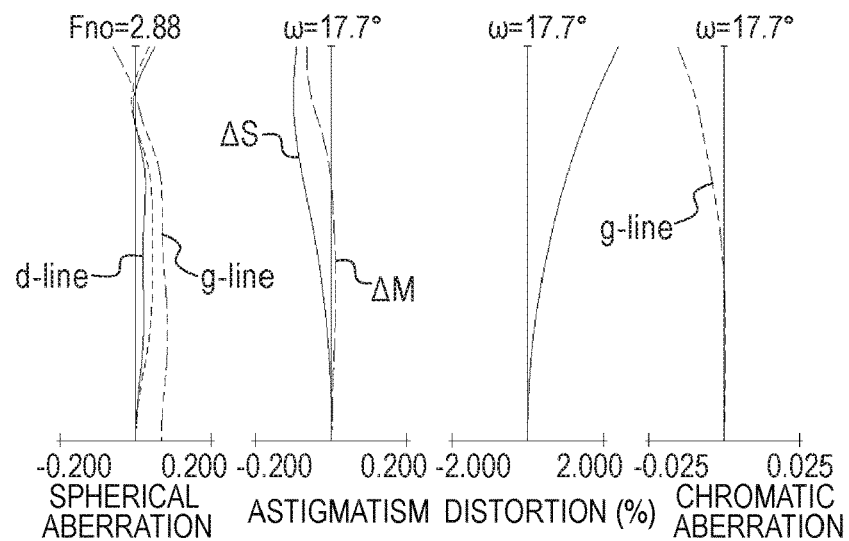
FIG. 2C is an aberration diagram of the zoom lens according to Example 1 at a telephoto end.

FIG. 1 is a lens cross-sectional view of a zoom lens according to Example 1 of the present invention at a wide angle end (short focal length end). FIG. 2A, FIG. 2B, and FIG. 2C are aberration diagrams of the zoom lens according to Example 1 at the wide angle end, an intermediate zoom position, and a telephoto end (long focal length end), respectively, when focused at infinity. Example 1 relates to a zoom lens having a zoom ratio of 2.75 and an f-number of 2.88.

FIG. 3 is a lens cross-sectional view of a zoom lens according to Example 2 of the present invention at the wide angle end. FIG. 4A, FIG. 4B, and FIG. 4C are aberration diagrams of the zoom lens according to Example 2 at the wide angle end, the intermediate zoom position, and the telephoto end, respectively, when focused at infinity. Example 2 relates to a zoom lens having a zoom ratio of 2.75 and an f-number of 2.91.

Figure 5:
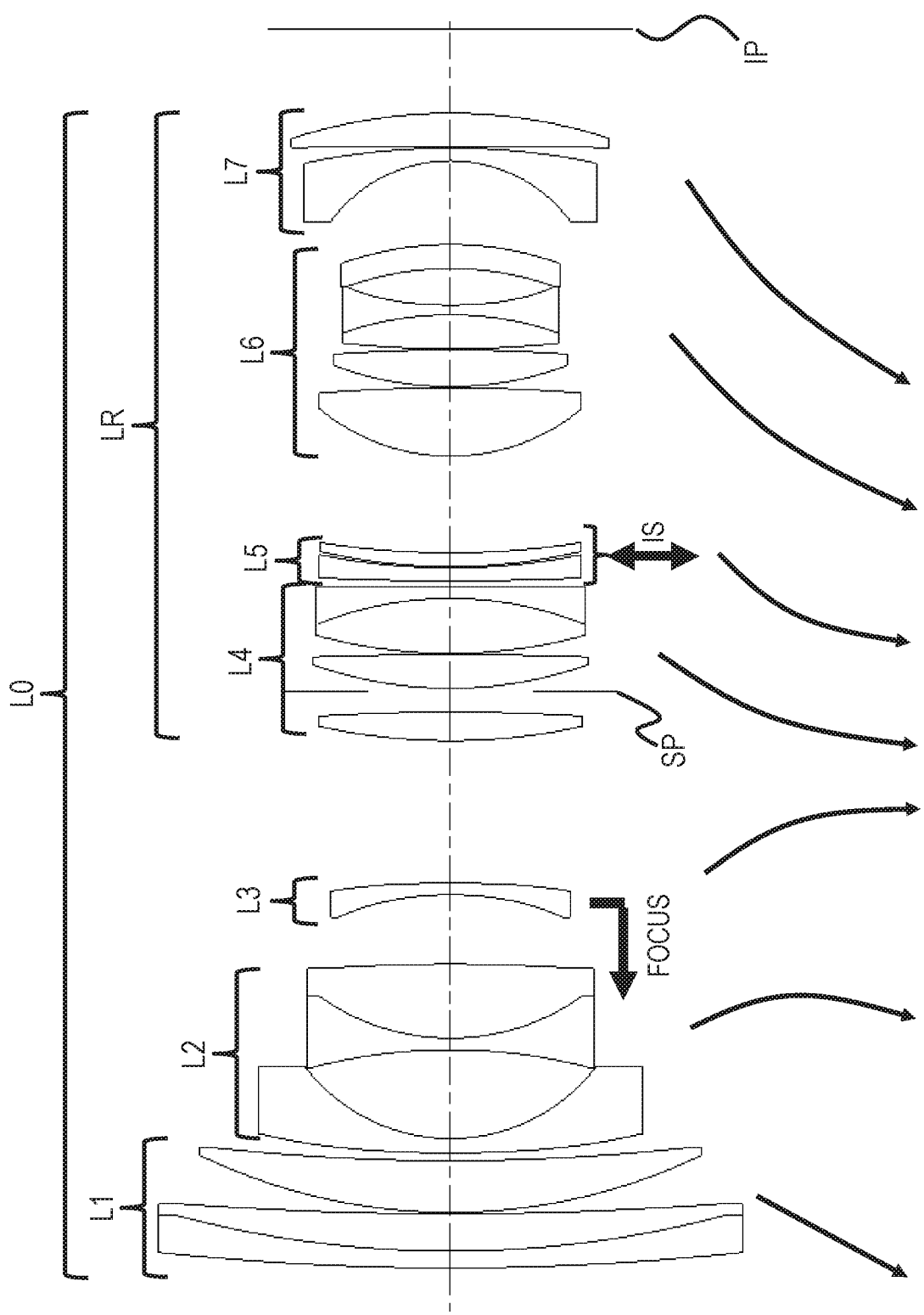
FIG. 5 is a lens cross-sectional view of a zoom lens according to Example 3 of the present invention at a wide angle end.
Figure 6A:
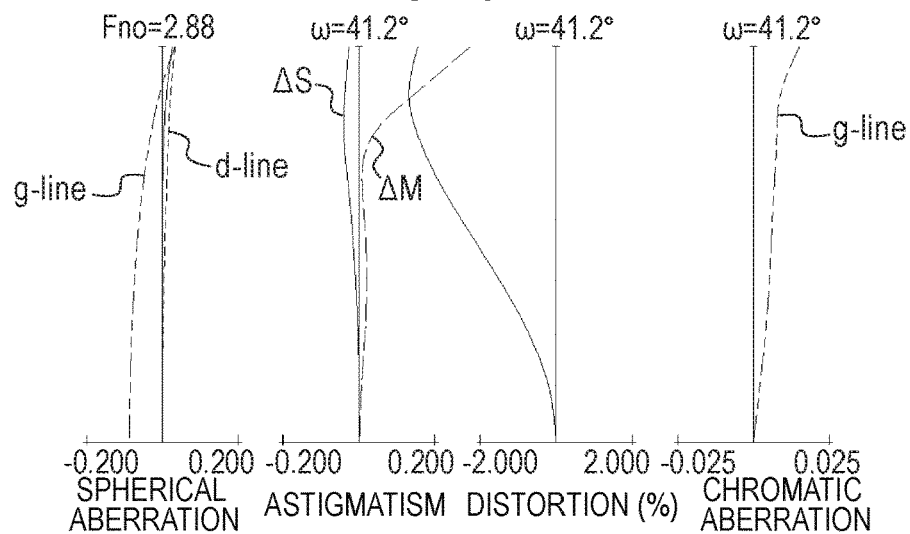
FIG. 6A is an aberration diagram of the zoom lens according to Example 3 at the wide angle end.
Figure 6B:
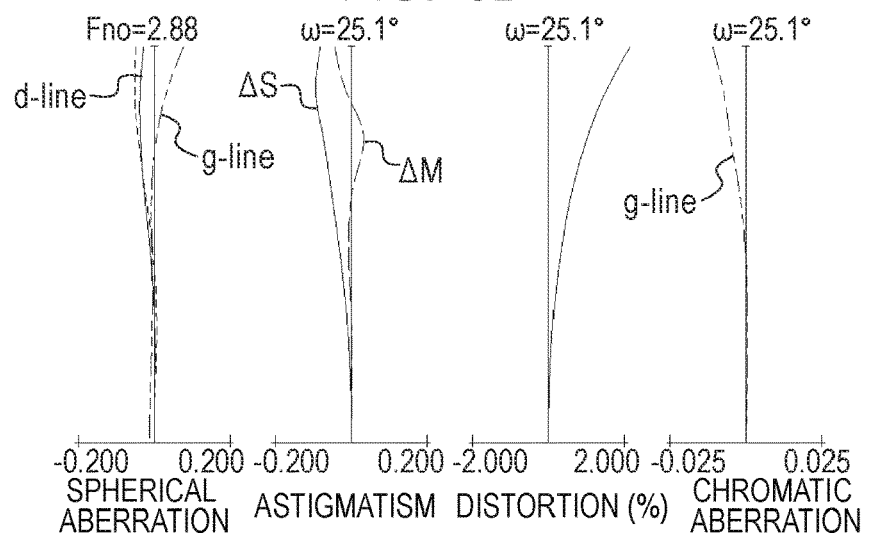
FIG. 6B is an aberration diagram of the zoom lens according to Example 3 at the intermediate zoom position.
Figure 6C:
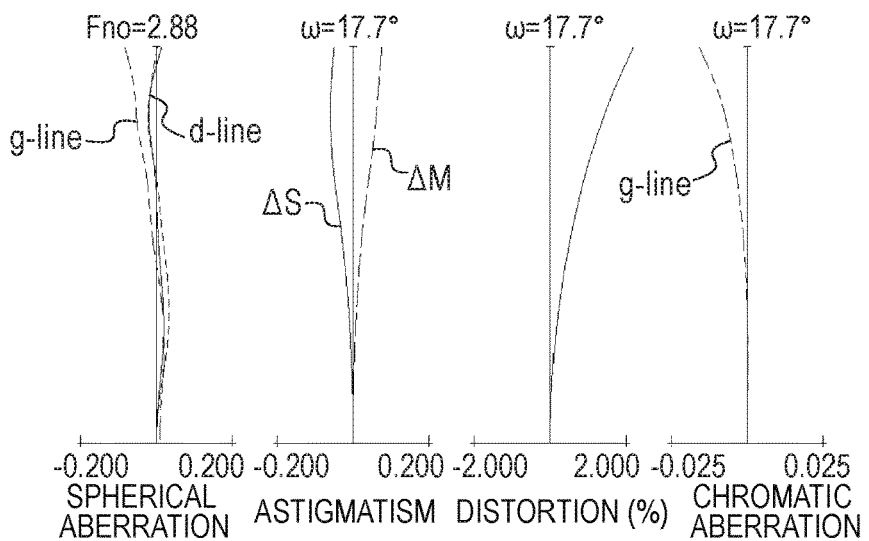
FIG. 6C is an aberration diagram of the zoom lens according to Example 3 at the telephoto end.

FIG. 5 is a lens cross-sectional view of a zoom lens according to Example 3 of the present invention at the wide angle end. FIG. 6A, FIG. 6B, and FIG. 6C are aberration diagrams of the zoom lens according to Example 3 at the wide angle end, the intermediate zoom position, and the telephoto end, respectively, when focused at infinity. Example 3 relates to a zoom lens having a zoom ratio of 2.75 and an f-number of 2.88.

Figure 7:
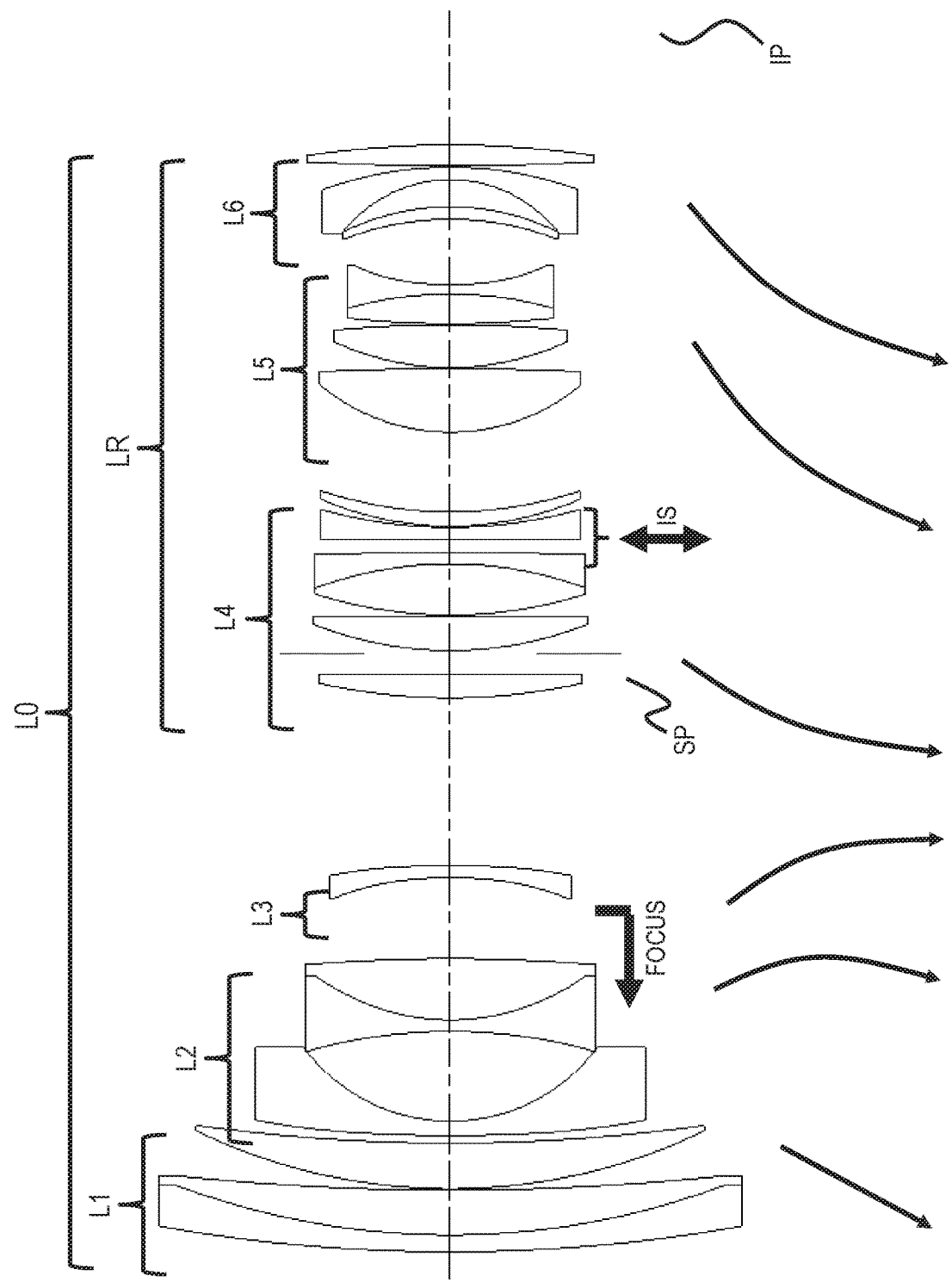
FIG. 7 is a lens cross-sectional view of a zoom lens according to Example 4 of the present invention at a wide angle end.

FIG. 7 is a lens cross-sectional view of a zoom lens according to Example 4 of the present invention at the wide angle end. FIG. 8A, FIG. 8B, and FIG. 8C are aberration diagrams of the zoom lens according to Example 4 at the wide angle end, the intermediate zoom position, and the telephoto end, respectively, when focused at infinity. Example 4 relates to a zoom lens having a zoom ratio of 2.75 and an f-number of 2.88.

Figure 9:
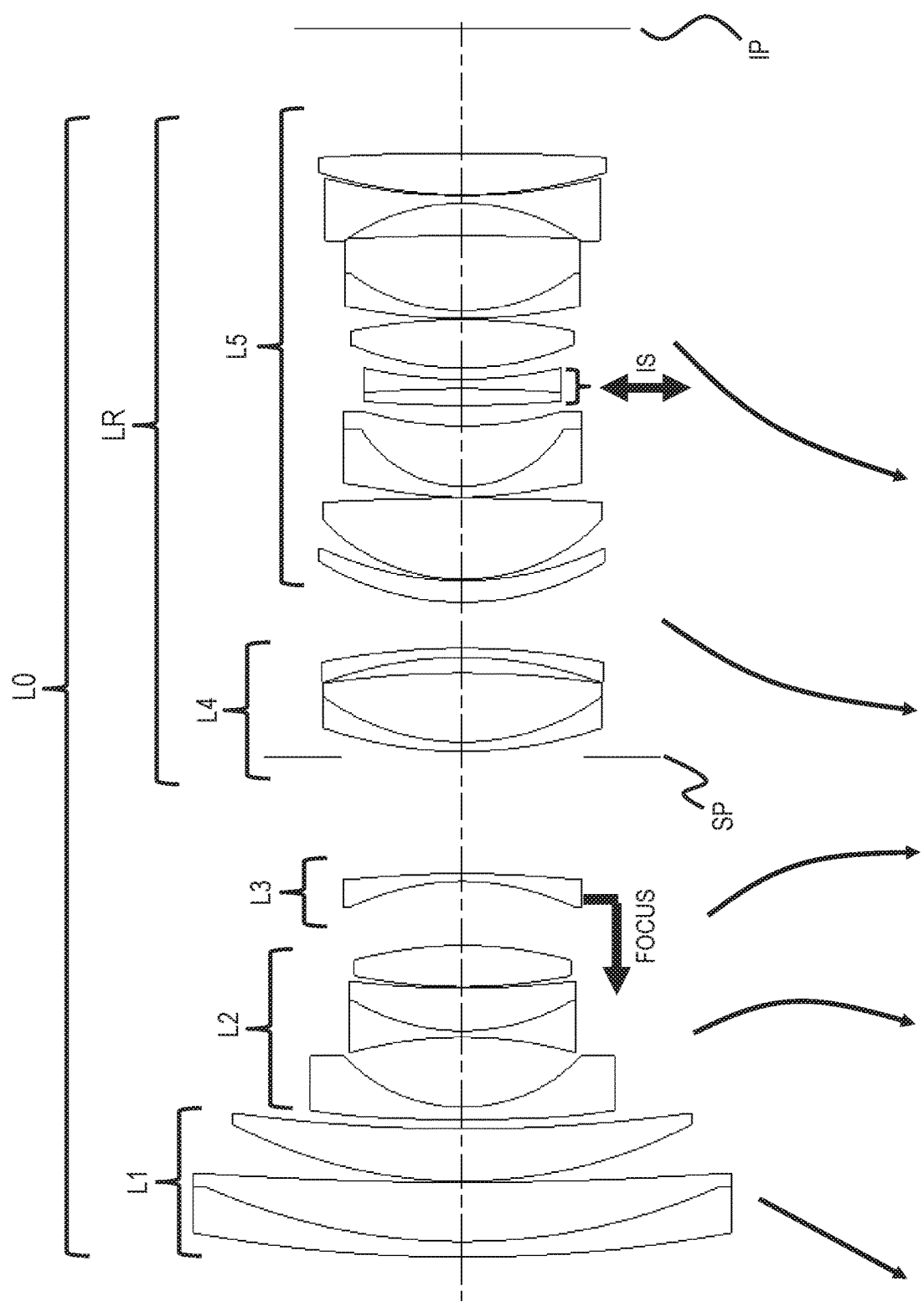
FIG. 9 is a lens cross-sectional view of a zoom lens according to Example 5 of the present invention at a wide angle end.
Figure 11:
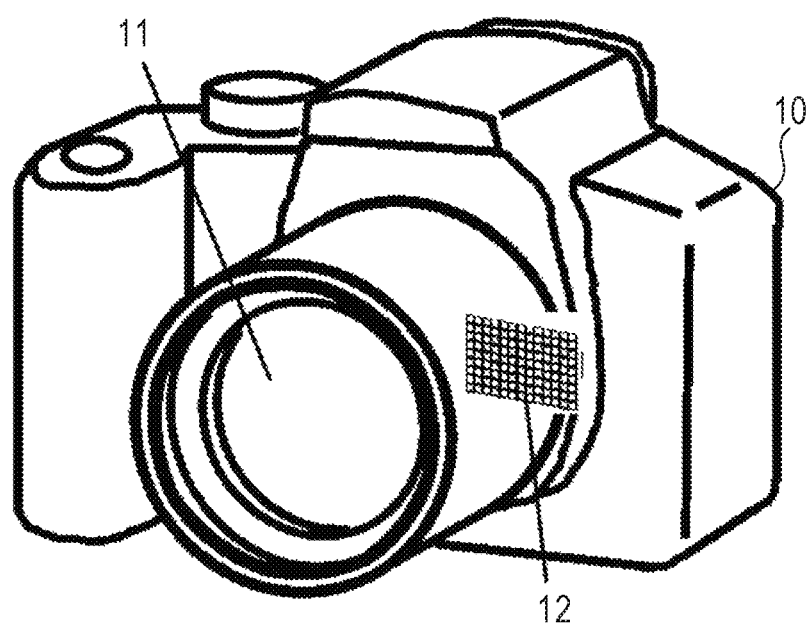
FIG. 11 is a schematic view of a main part of an image pickup apparatus according to one embodiment of the present invention.

FIG. 9 is a lens cross-sectional view of a zoom lens according to Example 5 of the present invention at the wide angle end. FIG. 10A, FIG. 10B, and FIG. 10C are aberration diagrams of the zoom lens according to Example 5 at the wide angle end, the intermediate zoom position, and the telephoto end, respectively, when focused at infinity. Example 5 relates to a zoom lens having a zoom ratio of 3.04 and an f-number of from 2.00 to 2.88. FIG. 11 is a schematic view of a main part of an image pickup apparatus according to one embodiment of the present invention.

The zoom lens according to each of Examples is an image pickup optical system for use with an image pickup apparatus, for example, a video camera, a digital still camera, or a TV camera. The zoom lens according to each of Examples may also be used as a projection optical system for a projection device (projector). In the lens cross-sectional views, the left side is an object side (front side), and the right side is an image side (rear side). Moreover, in the lens cross-sectional views, a zoom lens is denoted by L0. When the order of a lens unit from the object side is represented by "i", the i-th lens unit is denoted by Li.

A rear lens group LR includes one or more lens units. An aperture stop SP determines (restricts) a light flux at the minimum f-number (Fno). A flare cutter FC contributes to an improvement in optical performance by cutting an unnecessary ray at an intermediate image height. An image stabilization unit IS is also provided. As an image plane IP, an image pickup surface of a solid-state image pickup element (photo-electric conversion element), for example, a CCD sensor or a CMOS sensor, is placed when in use as a photographing optical system of a video camera or a digital still camera. The arrows indicate movement loci of the lens units during zooming from the wide angle end to the telephoto end.

The arrow regarding focus indicates a movement direction of a lens unit during focusing from infinity to a close distance.

In the aberration diagrams, an f-number is represented by Fno, and a half angle of view (degrees) is represented by "ω", and is a half angle of view in ray tracing value. In the spherical aberration diagrams, a solid line "d" indicates a d-line (wavelength: 587.56 nm), a two-dot chain line "g" indicates a g-line (wavelength: 435.835 nm). In the astigmatism diagrams, a solid line ΔS indicates a sagittal image plane with respect to the d-line, and a broken line ΔM indicates a meridional image plane with respect to the d-line. The distortion is depicted for the d-line. In the lateral chromatic aberration diagrams, a two-dot chain line "g" indicates a g-line, a one-dot chain line C indicates a C-line, and a broken line F indicates an F-line.

In order to obtain a compact zoom lens having a predetermined zoom ratio, small in aberration variation during focusing, and high optical performance over the entire zoom range, it is important to appropriately set, for example, the number of lens units and refractive powers of the lens units. Therefore, the zoom lens according to each of Examples has the following configuration.

The zoom lens according to each of Examples consists of, in order from the object side to the image side, a first lens unit L1 having a positive refractive power, a second lens unit L2 having a negative refractive power, a third lens unit L3 having a negative refractive power, and the rear lens group LR consisting of one or more lens units. The rear lens group LR includes a fourth lens unit L4 having a positive refractive power, which includes the aperture stop SP.

With the zoom lens according to each of Examples, the magnification is varied mainly by the movement of the first lens unit L1, the second lens unit L2, the third lens unit L3, and the fourth lens unit L4. The first lens unit L1 is moved toward the object side during zooming to achieve a higher zoom ratio while reducing an effective diameter of a front lens at the wide angle end. Further, the fourth lens unit L4 and the subsequent lens units are moved toward the object side during zooming from the wide angle end to the telephoto end, to thereby obtain a high magnification varying effect. Over an entire zoom area, the focusing from infinity to a close distance is performed by drawing out the third lens unit L3 toward the object side as indicated by the arrow of "FOCUS".

The zoom lens L0 according to each of Examples consists of, in order from the object side to the image side, the first lens unit L1 having a positive refractive power, the second lens unit L2 having a negative refractive power, the third lens unit L3 having a negative refractive power, and the rear lens group LR including one or more lens units. The third lens unit L3 is moved during focusing. Further, an interval between the second lens unit L2 and the third lens unit L3 becomes wider during zooming from the wide angle end to the telephoto end.

In the positive-lead type zoom lens, in order to effectively use the back focus to reduce the total lens length, the negative refractive power of a lens unit having a negative refractive power on the object side of the aperture stop SP may be caused to become weaker to some extent. Moreover, the positive refractive power of a lens unit having a positive refractive power on the image side of the aperture stop SP may be caused to become stronger.

With this configuration, it is further possible to easily ensure satisfactory optical performance over the entire zoom range. Further, with the zoom lens having such a large aperture ratio as to exhibit an aperture ratio exceeding Fno=2.8, it is effective to perform focusing by a lens unit near the aperture stop SP in order to suppress a variation in image magnification during focusing and downsize an entire system of the zoom lens while ensuring satisfactory optical performance at the closest distance.

When the negative refractive power of the second lens unit L2 serving as a main magnification-varying lens unit is set relatively weak, it is possible to cause the refractive power to be shared with the third lens unit L3 for focusing, which is placed subsequently thereto, while maintaining high optical performance. This allows the optical performance to be satisfactorily maintained during focusing.

Further, the third lens unit L3 is moved so as to increase a lens unit interval relative to the second lens unit L2 throughout zooming from the wide angle end to the telephoto end. With this configuration, the total lens length is effectively reduced as a so-called retrofocus configuration for causing the negative refractive power to become closer to the object side at the wide angle end and as a telephoto configuration for causing the negative refractive power to become closer to the image side at the telephoto end.

Next, a description is given of the lens configuration in each of Examples. The zoom lens according to Example 1 is a five-unit zoom lens consisting of, in order from the object side to the image side, the first lens unit L1 having a positive refractive power, the second lens unit L2 having a negative refractive power, the third lens unit L3 having a negative refractive power, the fourth lens unit L4 having a positive refractive power, and a fifth lens unit L5 having a positive refractive power. The rear lens group LR consists of the fourth lens unit L4 having a positive refractive power and the fifth lens unit L5 having a positive refractive power.

During zooming from the wide angle end to the telephoto end, the first lens unit is moved in a straight line to the object side, and the second lens unit is moved toward the image side along a convex locus. The third lens unit is a focus lens unit configured to move toward the object side during focusing, and is moved along such a locus as to increase the interval relative to the second lens unit during zooming. The fourth lens unit includes an aperture stop in the lens unit, and is moved toward the object side during zooming. The fifth lens unit is moved toward the object side so as to decrease the interval relative to the fourth lens unit during zooming. In the fourth lens unit, two lenses, namely, a negative lens and a positive lens on the image side, form a so-called image stabilization unit configured to compensate for an image blur (camera shake) by being moved in a direction perpendicular to an optical axis.

Example 2 is the same as Example 1 in terms of a zoom type including the number of lens units and movement conditions for the lens units during zooming. Example 2 is also the same as Example 1 in terms of a focus scheme including the lens units to be moved during focusing and the movement directions. In the fifth lens unit L5, three lenses, namely, the fifth to seventh lenses as counted in order from the object side, form an image stabilization unit.

The zoom lens according to Example 3 is a seven-unit zoom lens consisting of, in order from the object side to the image side, the first lens unit L1 having a positive refractive power, the second lens unit L2 having a negative refractive power, the third lens unit L3 having a negative refractive power, the fourth lens unit L4 having a positive refractive power, the fifth lens unit L5 having a negative refractive power, a sixth lens unit L6 having a positive refractive power, and a seventh lens unit L7 having a negative refractive power. The rear lens group LR consists of the fourth lens unit L4 having a positive refractive power, the fifth lens unit L5 having a negative refractive power, the sixth lens unit L6 having a positive refractive power, and the seventh lens unit L7 having a negative refractive power.

During zooming from the wide angle end to the telephoto end, the first lens unit is moved in a straight line toward the object side, and the second lens unit L2 is moved toward the image side along a convex locus. The third lens unit L3 is a focus lens unit configured to move toward the object side during focusing from infinity to a close distance. The third lens unit L3 is moved along such a locus as to increase the interval relative to the second lens unit L2 during zooming from the wide angle end to the telephoto end. The fourth lens unit L4 includes the aperture stop SP in the lens unit, and is moved toward the object side during zooming from the wide angle end to the telephoto end.

The fifth lens unit L5 is moved toward the object side during zooming from the wide angle end to the telephoto end. The fifth lens unit L5 forms an image stabilization unit. During zooming from the wide angle end to the telephoto end, the sixth lens unit L6 and the seventh lens unit L7 are moved toward the object side. Further, during zooming from the wide angle end to the telephoto end, the lens units are moved so as to increase the interval between the fourth lens unit L4 and the fifth lens unit L5 and decrease the interval between the fifth lens unit L5 and the sixth lens unit L6.

The zoom lens according to Example 4 is a six-unit zoom lens consisting of, in order from the object side to the image side, the first lens unit L1 having a positive refractive power, the second lens unit L2 having a negative refractive power, the third lens unit L3 having a negative refractive power, the fourth lens unit L4 having a positive refractive power, the fifth lens unit L5 having a positive refractive power, and the sixth lens unit L6 having a negative refractive power. The rear lens group LR consists of the fourth lens unit L4 having a positive refractive power, the fifth lens unit L5 having a positive refractive power, and the sixth lens unit L6 having a negative refractive power.

During zooming from the wide angle end to the telephoto end, the first lens unit L1 is moved in a straight line toward the object side, and the second lens unit L2 is moved toward the image side along a convex locus. The third lens unit L3 is a focus lens unit configured to move toward the object side during focusing from infinity to a close distance. The third lens unit L3 is moved along such a locus as to increase the interval relative to the second lens unit L2 during zooming from the wide angle end to the telephoto end.

The fourth lens unit L4 includes the aperture stop SP in the lens unit, and is moved toward the object side during zooming from the wide angle end to the telephoto end. The fifth lens unit L5 is moved toward the object side so as to decrease the interval relative to the fourth lens unit L4 during zooming from the wide angle end to the telephoto end. The sixth lens unit L6 is moved toward the object side during zooming from the wide angle end to the telephoto end. In the fourth lens unit L4, two lenses, namely, a negative lens and a positive lens on the image side, form an image stabilization unit.

Example 5 is the same as Example 1 in terms of the zoom type and the focus scheme. Further, in the fifth lens unit L5, two lenses, namely, the fifth positive lens and the sixth negative lens as counted in order from the object side form an image stabilization unit.

In the zoom lens according to each of Examples, the interval between the second lens unit L2 and the third lens unit L3 becomes larger at the telephoto end than at the wide angle end, and the third lens unit L3 is moved during focusing. A focal length of the second lens unit L2 is represented by f2, and a focal length of the third lens unit L3 is represented by f3. In addition, a focal length of the entire system of the zoom lens at the wide angle end is represented by "fw", and the back focus at the wide angle end is represented by "skw". At this time, the following conditional expressions are satisfied:

$$-7.0 < f3/fw < -1.8 \quad (1);$$

$$0.36 < skw/fw < 1.0 \quad (2); \text{ and}$$

$$1.2 < f3/f2 < 5.0 \quad (3).$$

Next, technical meanings of the above-mentioned conditional expressions are described. The conditional expression (1) is intended to set the focal length f3 of the third lens unit L3 in order to achieve the reduction in total lens length and the reduction in weight of the third lens unit L3 for focusing.

When the value exceeds the upper limit value of the conditional expression (1) so that the negative focal length f3 becomes shorter (when the absolute value of the negative focal length becomes smaller), the negative refractive power of the third lens unit L3 becomes much stronger (the absolute value of the negative refractive power becomes much larger). As a result, a variation in field curvature is increased during focusing from infinity to the closest distance.

When the negative refractive power of the third lens unit L3 becomes much stronger, a light flux width becomes larger at the rear lens group LR, and hence it becomes difficult to correct higher-order spherical aberration at the telephoto end particularly in a zoom lens having a large aperture ratio. Alternatively, the focal length of the entire system of the zoom lens at the wide angle end becomes longer, and it becomes difficult to obtain a desired field of view at the wide angle end.

When the value falls below the lower limit value of the conditional expression (1) so that the negative focal length f3 becomes longer (when the absolute value of the negative focal length becomes larger), the negative refractive power of the third lens unit L3 becomes much weaker (the absolute value of a negative refractive power becomes much smaller). As a result, it is required to increase a movement amount of the third lens unit L3 during focusing, and it becomes difficult to downsize the entire system of the zoom lens.

The conditional expression (2) is intended to define the back focus at the wide angle end in order to achieve the reduction in total lens length. In this case, the back focus is defined as an optical path length obtained by converting in air a distance from the last lens to the image plane. When the value exceeds the upper limit value of the conditional expression (2) so that the back focus "skw" becomes longer, the total lens length becomes longer, and it becomes difficult to downsize the entire system of the zoom lens. Alternatively, when the focal length "fw" of the entire system of the zoom lens at the wide angle end becomes shorter, the refractive power of the lens unit having a negative refractive power on the object side of the aperture stop for a wider angle of view becomes stronger, it becomes difficult to obtain desired optical performance, and the effective diameter of a front lens is increased.

When the value falls below the lower limit value of the conditional expression (2) so that the back focus "skw" becomes much shorter, in a lens-exchangeable image pickup apparatus, a clearance for a lens mount attaching part becomes smaller, and it becomes difficult to perform mechanical layout. In addition, when a lens is arranged near an image pickup surface, a ghost ascribable to the image pickup surface and a lens near the image pickup surface is liable to disadvantageously occur.

Moreover, in order to control an angle of incidence of a ray on the image plane, it is required to enhance the positive refractive power of the last lens unit, which causes the optical performance to become lower. In addition, a space into which protective glass for an image pickup element and different kinds of filters are inserted becomes disadvantageously narrower.

The conditional expression (3) is intended to appropriately set the focal length f3 of the third lens unit L3 for focusing and the focal length f2 of the second lens unit L2. The conditional expression (3) is intended to reduce the total lens length at the wide angle end while satisfactorily maintaining the optical performance during focusing.

When the value exceeds the upper limit value of the conditional expression (3) so that the negative focal length f3 becomes longer, the negative refractive power of the third lens unit L3 becomes much weaker, the movement amount for focusing is increased, and it becomes difficult to downsize the entire system of the zoom lens. Alternatively, the negative focal length f2 becomes much shorter, the width of a ray that enters the third lens unit L3 at the telephoto end becomes much larger, and an effective diameter of the third lens unit L3 is disadvantageously increased.

When the value falls below the lower limit value of the conditional expression (3) so that the negative focal length f3 becomes shorter, the movement amount of the third lens unit L3 is decreased during focusing, but a variation in field curvature is disadvantageously increased during focusing from infinity to the closest distance. Further, when the negative refractive power of the third lens unit L3 becomes much stronger, the light flux width at the rear lens group LR becomes larger, and it becomes disadvantageously difficult to correct higher-order spherical aberration at the telephoto end particularly in the zoom lens having a large aperture ratio.

In each of Examples, it is preferred to satisfy one or more of conditional expressions provided below. The focal length of the first lens unit L1 is represented by f1. A combined focal length of the rear lens group LR at the wide angle end is represented by "frw". A lens unit interval between the second lens unit L2 and the third lens unit L3 at the telephoto end is represented by L23t, and a lens unit interval between the second lens unit L2 and the third lens unit L3 at the wide angle end is represented by L23w. A lateral magnification of the third lens unit L3 at the wide angle end is represented by β3w.

In addition, a lateral magnification of the third lens unit L3 at the telephoto end is represented by β3t, and a combined lateral magnification of the rear lens group LR at the telephoto end is represented by "βrt". A distance from the image plane to an exit pupil on the optical axis at the wide angle end is represented by POw. The movement amount of the first lens unit L1 during zooming from the wide angle end to the telephoto end is represented by m1.

At this time, it is preferred to satisfy at least one of the following conditional expressions.

$$-5.0 < f2/fw < -1.1 \quad (4)$$

$$2.0 < f1/fw < 7.0 \quad (5)$$

$$1.1 < frw/fw < 4.0 \quad (6)$$

$$1.05 < L23t/L23w < 5.00 \quad (7)$$

$$0.2 < \beta 3w < 0.8 \quad (8)$$

$$2.0 < (1-\beta 3t^2)\beta rt^2 < 5.0 \quad (9)$$

$$-3.0 < POw/fw < -1.2 \quad (10)$$

$$-6.0 < m1/fw < -1.0 \quad (11)$$

Next, the technical meaning of each of the conditional expressions given above is described. The conditional expression (4) is intended to appropriately set the focal length f2 of the second lens unit L2 having a negative refractive power, which serves as a main magnification varying lens unit, and to obtain high optical performance while achieving the reduction in total lens length.

When the value falls below the lower limit value of the conditional expression (4) so that the negative focal length f2 becomes much longer, the back focus becomes shorter, but in order to obtain a desired zoom ratio, the movement amount of the second lens unit L2 is increased, and the total lens length is increased. Further, the negative refractive power of the entire system of the zoom lens becomes weaker, a Petzval sum tends to become stronger in the positive direction, and an astigmatism and a field curvature are increased. Alternatively, when the focal length "fw" of the entire system of the zoom lens at the wide angle end becomes shorter, the refractive power of the lens unit having a negative refractive power on the object side of the aperture stop SP for a wider angle of view becomes stronger, the optical performance becomes lower, and the effective diameter of a front lens is further increased.

When the value exceeds the upper limit value of the conditional expression (4) so that the negative focal length f2 becomes much shorter, the negative refractive power of the second lens unit L2 becomes much stronger, the outer diameter of the subsequent third lens unit L3 for focusing becomes larger, and it becomes difficult to downsize the entire system of the zoom lens. Further, when the negative focal length of the second lens unit L2 becomes shorter, in order to reduce the total lens length at the wide angle end, it is required to cause the positive refractive powers of the third lens unit L3 and the subsequent lens units to become stronger than required. As a result, spherical aberration or other such aberration on the axis is increased, and it becomes difficult to correct such aberration. Alternatively, the focal length "fw" of the entire system of the zoom lens at the wide angle end becomes longer, and it becomes difficult to reduce the focal length of the entire system of the zoom lens at the wide angle end.

The conditional expression (5) defines the focal length "fw" of the entire system of the zoom lens and the focal length f1 of the first lens unit L1 at the wide angle end in order to obtain a required zoom ratio. When the value exceeds the upper limit value of the conditional expression (5) so that the positive focal length of the first lens unit L1 becomes longer, it becomes easy to correct lateral chromatic aberration at the wide angle end and to correct axial chromatic aberration at the telephoto end. However, the movement amount of the first lens unit L1 becomes larger during zooming, and the total lens length is disadvantageously increased.

When the value falls below the lower limit value of the conditional expression (5) so that the positive focal length of the first lens unit L1 becomes shorter, it becomes easy to downsize the entire system of the zoom lens, but it becomes difficult to satisfactorily correct, for example, spherical aberration and coma with a small number of lenses. Alternatively, when the focal length "fw" of the entire system of the zoom lens at the wide angle end becomes longer, it becomes difficult to ensure a desired zoom ratio.

The conditional expression (6) defines the combined focal length "frw" of the rear lens group LR at the wide angle end in order to reduce the total lens length. When the value exceeds the upper limit value of the conditional expression (6) so that the combined focal length "frw" becomes longer, the positive refractive power of a lens unit on the image side of the aperture stop SP becomes weaker, and it becomes difficult to reduce the total lens length at the wide angle end. Alternatively, when the focal length "fw" of the entire system of the zoom lens at the wide angle end becomes shorter, the refractive power of the lens unit having a negative refractive power on the object side of the aperture stop SP for a wider angle of view becomes stronger, it becomes difficult to obtain desired optical performance, and the effective diameter of a front lens is further increased.

The conditional expression (7) defines the lens unit interval between the second lens unit L2 and the third lens unit L3 in order to reduce the total lens length at the wide angle end and at the telephoto end.

When the value exceeds the upper limit value of the conditional expression (7) so that a lens unit interval L23t becomes larger, a telephoto arrangement becomes stronger at the telephoto end, and it becomes easy to vary the magnification. However, the incident width of an axial flux on the third lens unit L3 becomes larger, and the effective diameter of the third lens unit L3 is increased. Further, when an interval between the third lens unit L3 and the rear lens group LR becomes much smaller, a tolerance of the interval between the lenses at infinity becomes much smaller, and a manufacturing tolerance error becomes disadvantageously smaller. Alternatively, when a lens unit interval L23w becomes smaller, a tolerance at the wide angle end during image pickup at the closest distance becomes smaller, and the manufacturing tolerance error becomes disadvantageously smaller.

When the value falls below the lower limit value of the conditional expression (7) so that the lens unit interval L23t becomes smaller, an effect of the telephoto arrangement at the telephoto end becomes weaker, a magnification-varying action due to a change in lens unit interval between the second lens unit L2 and the third lens unit L3 becomes smaller, and hence it becomes difficult to reduce the total lens length. Alternatively, when the lens unit interval L23w becomes larger, such a refractive power arrangement as to reduce a retrofocus effect of the entire zoom lens at the wide angle end is exhibited, and hence it becomes difficult to reduce the total lens length at the wide angle end.

The conditional expression (8) is intended to define the lateral magnification β3w of the third lens unit L3 at the wide angle end in order to achieve the reduction in total lens length while satisfactorily maintaining the optical performance exhibited by the third lens unit L3 during focusing. When the value exceeds the upper limit value of the conditional expression (8), focus sensitivity of the third lens unit L3 becomes much higher, and it becomes difficult to perform mechanical and high-level drive control during focusing. When the value falls below the lower limit value of the conditional expression (8), the focus sensitivity of the third lens unit L3 becomes lower, and the optical performance at the closest distance becomes disadvantageously lower, while the length of the third lens unit L3 in an optical axis direction is disadvantageously increased.

The conditional expression (9) is a conditional expression intended to define the lateral magnification β3t of the third lens unit L3 at the telephoto end and the combined lateral magnification "βrt" of the rear lens group LR arranged on the image side of the third lens unit L3 at the telephoto end in order to achieve high focusing performance at the telephoto end. That is, the conditional expression (9) is an expression itself for the focus sensitivity at the telephoto end.

When the value exceeds the upper limit value of the conditional expression (9) so that the focus sensitivity becomes higher, it becomes disadvantageously difficult to mechanically control the focus lens unit. Further, the refractive power of the focus lens unit tends to become higher, and hence it becomes disadvantageously difficult to ensure sufficient optical performance during imaging at a close distance. When the value falls below the lower limit value of the conditional expression (9) so that the focus sensitivity becomes smaller, the movement amount during focusing becomes larger, a mechanical layout tends to become larger, which is disadvantageous from the viewpoint of downsizing.

The conditional expression (10) defines a relationship between the exit pupil position POw at the wide angle end and the focal length "fw" of the entire system of the zoom lens at the wide angle end in order to ensure high telecentricity. In this case, the exit pupil position POw is defined as being negative when the position is on the object side of the image plane. When the value exceeds the upper limit value of the conditional expression (10) so that the exit pupil position POw becomes larger, the refractive power of the last lens unit tends to become stronger, and it becomes difficult to sufficiently suppress the field curvature.

When the value falls below the lower limit value of the conditional expression (10) so that the exit pupil position POw becomes smaller, an angle of incidence of a ray at a peripheral image height on the image plane becomes much larger, and so-called shading is disadvantageously increased. Alternatively, the focal length "fw" of the entire system of the zoom lens at the wide angle end becomes longer, and it becomes difficult to obtain a desired zoom magnification.

The conditional expression (11) is intended to define the focal length of the entire system of the zoom lens at the wide angle end and the movement amount of the first lens unit L1 during zooming. In this case, the movement amount of the first lens unit L1 is defined by a difference between the position on the optical axis at the wide angle end and the position on the optical axis at the telephoto end. The movement amount of the first lens unit L1 has a negative sign when the lens unit is moved so as to be located closer to the object side at the telephoto end than at the wide angle end, and has a positive sign when the lens unit is moved so as to be located closer to the image side at the telephoto end than at the wide angle end.

When the value exceeds the upper limit value of the conditional expression (11) so that the focal length of the entire system of the zoom lens at the wide angle end becomes longer, it becomes difficult to obtain a high zoom ratio. Alternatively, when the movement amount of the first lens unit L1 becomes smaller, the positive refractive power of the first lens unit L1 becomes much stronger, and spherical aberration and coma are disadvantageously increased.

When the value falls below the lower limit value of the conditional expression (11) so that the focal length of the entire system of the zoom lens at the wide angle end becomes shorter, the lens effective diameter of the first lens unit L1 becomes larger, and the entire system of the zoom lens is disadvantageously increased in size. Alternatively, when the movement amount of the first lens unit L1 during zooming becomes larger, the total lens length at the telephoto end becomes longer, and the entire system of the zoom lens is disadvantageously increased in size.

In each of Examples, it is preferred to set the numerical ranges of Conditional Expression (1) to Conditional Expression (11) as follows.

$$-5.0 < f3/fw < -1.9 \tag{1a}$$

$$0.38 < skw/fw < 0.90 \tag{2a}$$

$$1.3 < f3/f2 < 4.0 \tag{3a}$$

$$-3.0 < f2/fw < -1.2 \tag{4a}$$

$$2.5 < f1/fw < 6.0 \tag{5a}$$

$$1.1 < frw/fw < 3.0 \tag{6a}$$

$1.05 < L23t/L23w < 3.00$ (7a)

$0.25 < \beta 3w < 0.70$ (8a)

$2.01 < (1-\beta 3t^2)\beta rt^2 < 4.5$ (9a)

$-2.8 < POw/fw < -1.3$ (10a)

$-4.0 < m1/fw < -1.1$ (11a)

Moreover, in each of Examples, it is further preferred to set the numerical ranges of Conditional Expression (1a) to Conditional Expression (11a) as follows.

$-4.50 < f3/fw < -1.95$ (1b)

$0.39 < skw/fw < 0.70$ (2b)

$1.35 < f3/f2 < 3.50$ (3b)

$-2.0 < f2/fw < -1.2$ (4b)

$3.0 < f1/fw < 5.5$ (5b)

$1.2 < frw/fw < 2.0$ (6b)

$1.1 < L23t/L23w < 2.0$ (7b)

$0.3 < \beta 3w < 0.6$ (8b)

$2.02 < (1-\beta 3t^2)\beta rt^2 < 4.0$ (9b)

$-2.5 < POw/fw < -1.5$ (10b)

$-2.0 < m1/fw < -1.2$ (11b)

In each of Examples, it is preferred that the third lens unit serving as a focus lens unit is as lightweight as possible in order to increase the focusing speed. For that reason, it is preferred that the third lens unit L3 consists of a cemented lens consisting of two or less lenses or consists of one lens. It is further preferred that the surface of at least one lens in the third lens unit L3 be formed to have an aspherical shape.

Further, in order to obtain a wide angle of view and a high zoom ratio while downsizing the entire system of the zoom lens, the first lens unit L1 is more preferred to have a smaller number of lenses. With this configuration, a height of incidence of an off-axis light flux passing through the first lens unit L1 becomes smaller, and it is possible to reduce the effective diameter of the first lens unit L1. Therefore, the first lens unit L1 may be formed of three or less lenses. Further, in order to achieve a wider angle of view, the second lens unit L2 is preferred to include, in order from the object side to the image side, two negative lenses and one positive lens. With this configuration, the second lens unit L2 is configured to have a negative refractive power, which facilitates a wider angle of view.

Further, according to each of Examples, various off-axis aberrations, in particular, astigmatism and distortion, are satisfactorily corrected by appropriately setting the refractive power of the rear lens group LR. Moreover, spherical aberration and coma are effectively corrected during achieving a wider angle of view and a higher zoom ratio.

In each of Examples, the components are configured in the above-mentioned manner, to thereby obtain a zoom lens having a short total length, a small lens effective diameter, and high focusing performance.

Next, a digital still camera (image pickup apparatus) according to one embodiment of the present invention, which uses the zoom lens according to each of Examples as an image pickup optical system, is described with reference to FIG. 11.

In FIG. 11, a camera main body 10, and an image pickup optical system 11 formed of the zoom lens described in any of Examples are illustrated. A solid-state image pickup element (photo-electric conversion element) 12 such as a CCD sensor or a CMOS sensor is included in the camera main body 10, and is configured to receive light of an object image formed by the image pickup optical system 11.

Numerical Data 1 to 5 corresponding to Examples 1 to 5, respectively, are provided below. In each set of Numerical Data, the order of a surface from the object side is represented by "i". In each set of Numerical Data, a curvature radius of the i-th lens surface from the object side is represented by "ri", a lens thickness and air interval between the i-th lens surface and the (i+1)th lens surface from the object side is represented by "di", and a refractive index and an Abbe number of a material of a lens between the i-th lens surface and the (i+1)th lens surface from the object side with respect to the d-line are represented by "ndi" and "vdi", respectively. Symbol BF represents the back focus. When an X axis is set in the optical axis direction, an H axis is set in a direction perpendicular to the optical axis, a traveling direction of light is defined as positive, a paraxial curvature radius is represented by R, and aspherical coefficients are represented by K, A2, A4, A6, A8, A10, and A12, an aspherical shape is given by the following equation.

$$X = \frac{(1/R)}{1+\sqrt{1-(1+K)(H/R)^2}} + A2 \times H^2 +$$

$$A4 \times H^4 + A6 \times H^6 + A8 \times H^8 + A10 \times H^{10} + A12 \times H^{12}$$

In each of the aspherical coefficients, "e-x" means "$10^{-x}$". Further, in addition to specifications including the focal length and the f-number, a half angle of view of the entire system of the zoom lens, an image height being a maximum image height that determines the half angle of view, and the total lens length being a distance from a first lens surface to the image plane on the optical axis are also provided. A back focus BF represents an air-equivalent distance on the optical axis from the last lens surface to the image plane. Further, each set of lens unit data indicates each lens unit and its focal length.

In addition, the part in which an interval "d" of each optical surface is "(variable)" is changed during zooming, and an interval between surfaces corresponding to the focal length is shown in an annexed table. Results of calculations of the conditional expressions based on lens data in Numerical Data 1 to 5 described below are shown in Table 1.

[Numerical Data 1]

| Unit: mm | | | | |
|---|---|---|---|---|
| Surface data | | | | |
| Surface number | r | d | nd | vd |
| 1 | 432.460 | 2.00 | 1.80810 | 22.8 |
| 2 | 125.092 | 5.52 | 1.72916 | 54.7 |
| 3 | 1,309.759 | 0.15 | | |
| 4 | 66.447 | 6.26 | 1.72916 | 54.7 |
| 5 | 205.666 | (Variable) | | |
| 6* | 154.358 | 1.70 | 1.85400 | 40.4 |
| 7 | 20.373 | 9.42 | | |

-continued

Unit: mm

| | | | | |
|---|---|---|---|---|
| 8 | −54.414 | 1.35 | 1.53775 | 74.7 |
| 9 | 25.491 | 7.76 | 1.76182 | 26.5 |
| 10 | −145.189 | (Variable) | | |
| 11* | −44.365 | 1.40 | 1.77250 | 49.6 |
| 12* | −296.834 | (Variable) | | |
| 13 | 130.090 | 2.77 | 1.72916 | 54.7 |
| 14 | −129.419 | 2.50 | | |
| 15 (Stop) | ∞ | 0.30 | | |
| 16 | 47.327 | 4.92 | 1.59522 | 67.7 |
| 17 | −122.438 | 0.15 | | |
| 18 | 46.629 | 6.45 | 1.49700 | 81.5 |
| 19 | −39.419 | 1.30 | 1.95375 | 32.3 |
| 20 | −217.709 | 1.56 | | |
| 21* | −173.136 | 1.50 | 1.76802 | 49.2 |
| 22 | 51.643 | 0.15 | | |
| 23 | 36.796 | 1.73 | 1.76081 | 35.4 |
| 24 | 46.562 | (Variable) | | |
| 25 | 25.855 | 6.93 | 1.49700 | 81.5 |
| 26 | −185.611 | 0.15 | | |
| 27 | 32.445 | 5.57 | 1.49700 | 81.5 |
| 28 | −113.829 | 0.15 | | |
| 29 | 152.509 | 4.82 | 1.49700 | 81.5 |
| 30 | −32.532 | 1.15 | 1.85400 | 40.4 |
| 31* | 41.061 | 6.53 | | |
| 32 | −27.368 | 3.27 | 1.59270 | 35.3 |
| 33 | −23.864 | 2.82 | | |
| 34 | −16.427 | 1.50 | 1.48749 | 70.2 |
| 35 | −49.060 | 0.15 | | |
| 36 | 174.742 | 3.32 | 2.00069 | 25.5 |
| 37 | −127.437 | (Variable) | | |
| Image plane | ∞ | | | |

Aspherical surface data

Sixth surface

K = 0.00000e+000   A4 = 3.63436e−006   A6 = −2.68714e−009
A8 = 2.41369e−012   A10 = −3.81151e−015   A12 = 5.12532e−018

Eleventh surface

K = 0.00000e+000   A4 = −5.56516e−005   A6 = 3.53050e−007
A8 = −1.51960e−009   A10 = 3.30013e−012   A12 = −1.78434e−015

Twelfth surface

K = 0.00000e+000   A4 = −5.15168e−005   A6 = 3.60413e−007
A8 = −1.67851e−009   A10 = 4.45364e−012   A12 = −4.83534e−015

Twenty-first surface

K = 0.00000e+000   A4 = 1.31489e−006   A6 = −1.95561e−010
A8 = 1.77865e−011   A10 = −1.00521e−013   A12 = 1.36914e−016

Thirty-first surface

K = 0.00000e+000   A4 = 2.23797e−005   A6 = 7.61797e−009
A8 = 3.21907e−010   A10 = −1.64419e−012   A12 = 7.03286e−015

Various data
Zoom ratio 2.75

| | Wide angle | Intermediate | Telephoto |
|---|---|---|---|
| Focal length | 24.71 | 45.00 | 67.90 |
| F-number | 2.88 | 2.88 | 2.88 |
| Half angle of view (degrees) | 41.21 | 25.68 | 17.67 |
| Image height | 21.64 | 21.64 | 21.64 |
| Total lens length | 143.89 | 161.78 | 179.68 |
| BF | 13.42 | 27.34 | 38.58 |
| d5 | 0.90 | 18.97 | 30.85 |
| d10 | 6.41 | 7.78 | 8.83 |
| d12 | 16.50 | 6.08 | 1.10 |
| d24 | 11.42 | 6.37 | 5.08 |
| d37 | 13.42 | 27.34 | 38.58 |

-continued

Unit: mm

Lens unit data

| Unit | First surface | Focal length |
|---|---|---|
| 1 | 1 | 121.70 |
| 2 | 6 | −34.30 |
| 3 | 11 | −67.69 |
| 4 | 13 | 44.18 |
| 5 | 25 | 50.71 |

[Numerical Data 2]

Unit: mm

Surface data

| Surface number | r | d | nd | vd |
|---|---|---|---|---|
| 1 | 266.943 | 2.00 | 1.80810 | 22.8 |
| 2 | 107.248 | 5.20 | 1.72916 | 54.7 |
| 3 | 582.229 | 0.15 | | |
| 4 | 70.988 | 5.77 | 1.72916 | 54.7 |
| 5 | 235.023 | (Variable) | | |
| 6* | 83.175 | 1.70 | 1.85400 | 40.4 |
| 7 | 19.439 | 9.80 | | |
| 8 | −64.009 | 1.35 | 1.59522 | 67.7 |
| 9 | 25.043 | 0.00 | | |
| 10 | 25.043 | 7.00 | 1.80810 | 22.8 |
| 11 | 571.374 | 2.10 | | |
| 12 | −43.459 | 2.24 | 1.64769 | 33.8 |
| 13 | −40.066 | (Variable) | | |
| 14* | −42.596 | 1.40 | 1.77250 | 49.6 |
| 15* | −283.991 | (Variable) | | |
| 16 | 72.447 | 4.13 | 1.72916 | 54.7 |
| 17 | −113.883 | 2.50 | | |
| 18 (Stop) | ∞ | 0.30 | | |
| 19 | 40.067 | 6.13 | 1.69680 | 55.5 |
| 20 | −144.330 | 2.09 | | |
| 21 | −46.413 | 1.35 | 2.00100 | 29.1 |
| 22 | 274.541 | (Variable) | | |
| 23 | ∞ | −0.35 | | |
| 24 | 55.123 | 7.28 | 1.59522 | 67.7 |
| 25 | −60.553 | 0.15 | | |
| 26 | 24.634 | 8.33 | 1.49700 | 81.5 |
| 27 | −112.588 | 0.15 | | |
| 28* | 47.182 | 1.30 | 1.85400 | 40.4 |
| 29 | 15.100 | 3.96 | 1.49700 | 81.5 |
| 30 | 26.904 | 2.61 | | |
| 31 | 49.476 | 1.55 | 1.95906 | 17.5 |
| 32 | 93.452 | 0.90 | 1.95375 | 32.3 |
| 33 | 32.229 | 3.30 | | |
| 34 | −62.042 | 1.10 | 2.00100 | 29.1 |
| 35 | −100.985 | 2.93 | | |
| 36 | 207.275 | 3.89 | 1.48749 | 70.2 |
| 37 | −55.930 | 2.61 | | |
| 38 | −26.377 | 1.73 | 1.58313 | 59.4 |
| 39* | −63.015 | 0.15 | | |
| 40 | −822.230 | 3.48 | 2.00069 | 25.5 |
| 41 | −67.577 | (Variable) | | |
| Image plane | ∞ | | | |

Aspherical surface data

Sixth surface

K = 0.00000e+000   A4 = 1.74742e−006   A6 = −1.55928e−009
A8 = 2.03209e−012   A10 = −4.46823e−015   A12 = 4.09239e−018

Fourteenth surface

K = 0.00000e+000   A4 = −4.00221e−005   A6 = 2.69271e−007
A8 = −1.39051e−009   A10 = 3.86824e−012   A12 = −3.07238e−015

Fifteenth surface

K = 0.00000e+000   A4 = −3.72813e−005   A6 = 2.66837e−007
A8 = −1.41507e−009   A10 = 4.29655e−012   A12 = −5.02900e−015

-continued

Unit: mm

Twenty-eighth surface

K = 0.00000e+000  A4 = −1.95490e−005  A6 = −1.97181e−008
A8 = −5.56893e−011  A10 = 5.63810e−013  A12 = −1.30707e−015

Thirty-ninth surface

K = 0.00000e+000  A4 = −4.60311e−006  A6 = −8.06725e−009
A8 = −1.36554e−011  A10 = 4.84124e−014  A12 = −2.11891e−016

Various data
Zoom ratio 2.75

|  | Wide angle | Intermediate | Telephoto |
| --- | --- | --- | --- |
| Focal length | 24.70 | 44.35 | 67.90 |
| F-number | 2.91 | 2.91 | 2.91 |
| Half angle of view (degrees) | 41.21 | 26.00 | 17.67 |
| Image height | 21.64 | 21.64 | 21.64 |
| Total lens length | 143.90 | 163.71 | 183.52 |
| BF | 16.31 | 31.98 | 46.03 |
| d5 | 0.90 | 16.97 | 28.31 |
| d13 | 4.32 | 5.96 | 6.21 |
| d15 | 14.26 | 5.39 | 1.17 |
| d22 | 7.84 | 3.15 | 1.54 |
| d41 | 16.31 | 31.98 | 46.03 |

Lens unit data

| Unit | First surface | Focal length |
| --- | --- | --- |
| 1 | 1 | 121.00 |
| 2 | 6 | −30.49 |
| 3 | 14 | −65.04 |
| 4 | 16 | 55.88 |
| 5 | 23 | 41.27 |

[Numerical Data 3]

Unit: mm

Surface data

| Surface number | r | d | nd | vd |
| --- | --- | --- | --- | --- |
| 1 | 323.533 | 2.00 | 1.80810 | 22.8 |
| 2 | 126.881 | 4.42 | 1.72916 | 54.7 |
| 3 | 440.043 | 0.15 |  |  |
| 4 | 68.302 | 6.12 | 1.72916 | 54.7 |
| 5 | 259.069 | (Variable) |  |  |
| 6* | 147.607 | 1.70 | 1.85400 | 40.4 |
| 7 | 21.628 | 10.52 |  |  |
| 8 | −64.369 | 1.35 | 1.53775 | 74.7 |
| 9 | 26.713 | 8.75 | 1.76182 | 26.5 |
| 10 | −220.427 | (Variable) |  |  |
| 11* | −42.546 | 1.40 | 1.77250 | 49.6 |
| 12* | −236.572 | (Variable) |  |  |
| 13 | 72.386 | 3.40 | 1.72916 | 54.7 |
| 14 | −248.059 | 2.50 |  |  |
| 15 (Stop) | ∞ | 0.30 |  |  |
| 16 | 48.518 | 3.99 | 1.59522 | 67.7 |
| 17 | −474.461 | 0.15 |  |  |
| 18 | 60.328 | 6.49 | 1.49700 | 81.5 |
| 19 | −42.118 | 1.30 | 1.95375 | 32.3 |
| 20 | 1,267.152 | (Variable) |  |  |
| 21* | 418.278 | 1.50 | 1.76802 | 49.2 |
| 22 | 77.355 | 0.15 |  |  |
| 23 | 67.064 | 1.64 | 1.84612 | 24.3 |
| 24 | 98.731 | (Variable) |  |  |
| 25 | 24.220 | 8.08 | 1.49700 | 81.5 |
| 26 | −192.788 | 0.15 |  |  |
| 27 | 39.644 | 4.32 | 1.49700 | 81.5 |
| 28 | −193.391 | 0.15 |  |  |
| 29 | 124.399 | 4.01 | 1.49700 | 81.5 |
| 30 | −38.984 | 1.15 | 1.85400 | 40.4 |
| 31* | 48.202 | (Variable) |  |  |
| 32 | −35.749 | 2.85 | 1.59270 | 35.3 |
| 33 | −37.810 | 9.89 |  |  |
| 34 | −17.549 | 1.50 | 1.48749 | 70.2 |
| 35 | −84.358 | 0.15 |  |  |
| 36 | −1,803.462 | 3.97 | 2.00069 | 25.5 |
| 37 | −60.328 | (Variable) |  |  |
| Image plane | ∞ |  |  |  |

Aspherical surface data

Sixth surface

K = 0.00000e+000  A4 = 2.63525e−006  A6 = −1.70776e−009
A8 = 1.98740e−012  A10 = −3.30313e−015  A12 = 2.66826e−018

Eleventh surface

K = 0.00000e+000  A4 = −3.79555e−005  A6 = 2.25195e−007
A8 = −8.96513e−010  A10 = 1.73006e−012  A12 = −7.30641e−016

Twelfth surface

K = 0.00000e+000  A4 = −3.51124e−005  A6 = 2.28717e−007
A8 = −9.86686e−010  A10 = 2.34438e−012  A12 = −2.20571e−015

Twenty-first surface

K = 0.00000e+000  A4 = 1.39889e−007  A6 = 7.56506e−010
A8 = 6.64308e−012  A10 = −3.73630e−014  A12 = 4.24931e−017

Thirty-first surface

K = 0.00000e+000  A4 = 2.10166e−005  A6 = 1.59242e−008
A8 = 2.44359e−010  A10 = −1.11611e−012  A12 = 5.10611e−015

Various data
Zoom ratio 2.75

|  | Wide angle | Intermediate | Telephoto |
| --- | --- | --- | --- |
| Focal length | 24.70 | 46.26 | 67.90 |
| F-number | 2.88 | 2.88 | 2.88 |
| Half angle of view (degrees) | 41.21 | 25.06 | 17.67 |
| Image height | 21.64 | 21.64 | 21.64 |
| Total lens length | 146.51 | 163.48 | 180.45 |
| BF | 9.99 | 24.27 | 37.01 |
| d5 | 0.90 | 18.62 | 28.05 |
| d10 | 8.20 | 9.02 | 10.00 |
| d12 | 16.82 | 5.79 | 1.15 |
| d20 | 0.80 | 2.10 | 5.00 |
| d24 | 11.42 | 4.95 | 1.44 |
| d31 | 4.33 | 4.68 | 3.75 |
| d37 | 9.99 | 24.27 | 37.01 |

Lens unit data

| Unit | First surface | Focal length |
| --- | --- | --- |
| 1 | 1 | 122.82 |
| 2 | 6 | −36.03 |
| 3 | 11 | −67.36 |
| 4 | 13 | 41.06 |
| 5 | 21 | −250.18 |
| 6 | 25 | 47.13 |
| 7 | 32 | −194.67 |

[Numerical Data 4]

Unit: mm

Surface data

| Surface number | r | d | nd | vd |
| --- | --- | --- | --- | --- |
| 1 | 197.899 | 2.00 | 1.80810 | 22.8 |
| 2 | 92.762 | 5.33 | 1.72916 | 54.7 |
| 3 | 313.793 | 0.15 |  |  |
| 4 | 69.740 | 5.42 | 1.72916 | 54.7 |
| 5 | 219.234 | (Variable) |  |  |

-continued

Unit: mm

| | | | | |
|---|---|---|---|---|
| 6* | 235.791 | 1.70 | 1.85400 | 40.4 |
| 7 | 21.745 | 10.74 | | |
| 8 | −60.427 | 1.35 | 1.53775 | 74.7 |
| 9 | 27.198 | 7.27 | 1.76182 | 26.5 |
| 10 | −210.994 | (Variable) | | |
| 11* | −59.728 | 1.40 | 1.77250 | 49.6 |
| 12* | −266.134 | (Variable) | | |
| 13 | 71.347 | 2.80 | 1.72916 | 54.7 |
| 14 | −6,357.657 | 2.50 | | |
| 15 (Stop) | ∞ | 0.30 | | |
| 16 | 43.682 | 4.07 | 1.59522 | 67.7 |
| 17 | −2,798.862 | 0.15 | | |
| 18 | 53.063 | 6.08 | 1.49700 | 81.5 |
| 19 | −45.898 | 1.30 | 1.95375 | 32.3 |
| 20 | −933.074 | 1.56 | | |
| 21* | −2,944.296 | 1.50 | 1.76802 | 49.2 |
| 22 | 56.115 | 0.15 | | |
| 23 | 38.398 | 1.71 | 1.75718 | 32.2 |
| 24 | 48.151 | (Variable) | | |
| 25 | 24.340 | 7.51 | 1.49700 | 81.5 |
| 26 | −352.182 | 0.15 | | |
| 27 | 32.883 | 5.05 | 1.49700 | 81.5 |
| 28 | −157.269 | 0.15 | | |
| 29 | 118.126 | 3.54 | 1.49700 | 81.5 |
| 30 | −43.812 | 1.15 | 1.85400 | 40.4 |
| 31* | 36.954 | (Variable) | | |
| 32 | −34.893 | 1.46 | 1.59270 | 35.3 |
| 33 | −28.968 | 3.20 | | |
| 34 | −16.261 | 1.50 | 1.48749 | 70.2 |
| 35 | −44.021 | 0.15 | | |
| 36 | 295.540 | 2.50 | 2.00069 | 25.5 |
| 37 | −114.318 | (Variable) | | |
| Image plane | ∞ | | | |

Aspherical surface data

Sixth surface

K = 0.00000e+000  A4 = 3.42888e−006   A6 = −2.61873e−009
A8 = 2.19904e−012  A10 = −2.71059e−015  A12 = 2.07774e−018

Eleventh surface

K = 0.00000e+000  A4 = −4.43596e−005  A6 = 2.05657e−007
A8 = −6.24320e−010  A10 = 8.57765e−013  A12 = 1.76408e−016

Twelfth surface

K = 0.00000e+000  A4 = −4.14002e−005  A6 = 2.12242e−007
A8 = −7.24059e−010  A10 = 1.38587e−012  A12 = −9.17591e−016

Twenty-first surface

K = 0.00000e+000  A4 = 4.62094e−007   A6 = −1.62996e−009
A8 = 3.09696e−011  A10 = −1.40164e−013  A12 = 1.89613e−016

Thirty-first surface

K = 0.00000e+000  A4 = 2.27896e−005   A6 = 1.47481e−008
A8 = 4.11513e−010  A10 = −2.32352e−012  A12 = 1.12313e−014

Various data
Zoom ratio 2.75

| | Wide angle | Intermediate | Telephoto |
|---|---|---|---|
| Focal length | 24.71 | 45.70 | 67.90 |
| F-number | 2.88 | 2.88 | 2.88 |
| Half angle of view (degrees) | 41.20 | 25.33 | 17.67 |
| Image height | 21.64 | 21.64 | 21.64 |
| Total lens length | 148.61 | 164.05 | 179.49 |
| BF | 17.00 | 30.55 | 41.54 |
| d5 | 0.90 | 18.75 | 29.58 |
| d10 | 9.58 | 10.65 | 11.64 |
| d12 | 20.03 | 7.08 | 1.08 |
| d24 | 9.47 | 5.28 | 4.03 |
| d31 | 7.78 | 7.90 | 7.79 |
| d37 | 17.00 | 30.55 | 41.54 |

Lens unit data

| Unit | First surface | Focal length |
|---|---|---|
| 1 | 1 | 123.63 |
| 2 | 6 | −32.87 |
| 3 | 11 | −99.99 |
| 4 | 13 | 53.58 |
| 5 | 25 | 49.12 |
| 6 | 32 | −448.46 |

[Numerical Data 5]

Unit: mm

Surface data

| Surface number | r | d | nd | vd |
|---|---|---|---|---|
| 1 | 193.245 | 2.00 | 1.84666 | 23.8 |
| 2 | 81.173 | 7.64 | 1.72916 | 54.7 |
| 3 | 496.078 | 0.15 | | |
| 4 | 63.271 | 6.75 | 1.77250 | 49.6 |
| 5 | 214.252 | (Variable) | | |
| 6* | 388.501 | 1.60 | 1.85400 | 40.4 |
| 7* | 21.848 | 9.00 | | |
| 8 | −53.092 | 0.90 | 1.90043 | 37.4 |
| 9 | 27.505 | 5.52 | 1.85478 | 24.8 |
| 10 | 117.377 | 0.15 | | |
| 11 | 68.760 | 5.33 | 1.85478 | 24.8 |
| 12 | −51.433 | (Variable) | | |
| 13* | −31.762 | 1.00 | 1.76802 | 49.2 |
| 14* | −128.610 | (Variable) | | |
| 15 (Stop) | ∞ | 0.70 | | |
| 16 | 54.994 | 1.20 | 1.85478 | 24.8 |
| 17 | 30.381 | 8.90 | 1.90043 | 37.4 |
| 18 | −122.606 | 2.01 | | |
| 19 | −51.172 | 1.20 | 1.85478 | 24.8 |
| 20 | −92.077 | (Variable) | | |
| 21 | 35.131 | 2.77 | 1.59522 | 67.7 |
| 22 | 41.293 | 0.15 | | |
| 23 | 24.760 | 10.52 | 1.59522 | 67.7 |
| 24 | −315.353 | 0.15 | | |
| 25* | 44.974 | 1.40 | 1.88202 | 37.2 |
| 26 | 15.251 | 7.77 | 1.49700 | 81.5 |
| 27 | 44.641 | 2.65 | | |
| 28 | 158.589 | 2.13 | 1.80809 | 22.8 |
| 29 | −156.512 | 1.20 | 1.88202 | 37.2 |
| 30* | 53.516 | 1.45 | | |
| 31 | 35.402 | 6.26 | 1.49700 | 81.5 |
| 32 | −70.082 | 0.15 | | |
| 33 | 72.246 | 1.00 | 1.91082 | 35.3 |
| 34 | 23.971 | 9.73 | 1.48749 | 70.2 |
| 35 | −257.433 | 4.17 | | |
| 36 | −26.443 | 1.00 | 1.49700 | 81.5 |
| 37 | 71.744 | 0.15 | | |
| 38 | 62.503 | 5.34 | 2.00069 | 25.5 |
| 39 | −278.940 | (Variable) | | |
| Image plane | ∞ | | | |

Aspherical surface data

Sixth surface

K = 0.00000e+000  A4 = 6.38437e−006   A6 = −6.54767e−009
A8 = 5.03273e−012  A10 = 4.72601e−015  A12 = −1.28436e−017

Seventh surface

K = 0.00000e+000  A4 = 3.33989e−006   A6 = 1.62249e−008
A8 = −5.46944e−011  A10 = 3.67869e−013

-continued

Unit: mm

Thirteenth surface

K = 0.00000e+000  A4 = −4.74432e−007  A6 = 1.28336e−008
A8 = 1.01212e−010  A10 = −1.86389e−013

Fourteenth surface

K = 0.00000e+000  A4 = −1.33263e−006  A6 = 1.40722e−008
A8 = 2.39598e−011  A10 = −6.79015e−014

Twenty-fifth surface

K = 0.00000e+000  A4 = −1.46298e−005  A6 = −1.42940e−008
A8 = 1.91882e−012  A10 = 1.64438e−013  A12 = −3.10187e−016

Thirtieth surface

K = 0.00000e+000  A4 = −4.85063e−007  A6 = −1.64474e−008
A8 = 1.06266e−010  A10 = −2.99925e−013

Various data
Zoom ratio 3.04

|  | Wide angle | Intermediate | Telephoto |
| --- | --- | --- | --- |
| Focal length | 28.00 | 53.77 | 85.00 |
| F-number | 2.00 | 2.60 | 2.88 |
| Half angle of view (degrees) | 37.69 | 21.92 | 14.28 |
| Image height | 21.64 | 21.64 | 21.64 |
| Total lens length | 158.50 | 176.83 | 195.16 |
| BF | 16.00 | 28.52 | 41.05 |
| d5 | 1.21 | 19.87 | 29.83 |
| d12 | 8.23 | 7.03 | 9.25 |
| d14 | 15.10 | 7.21 | 2.01 |
| d20 | 5.93 | 2.16 | 1.00 |
| d39 | 16.00 | 28.52 | 41.05 |

Lens unit data

| Unit | First surface | Focal length |
| --- | --- | --- |
| 1 | 1 | 98.71 |
| 2 | 6 | −39.68 |
| 3 | 13 | −55.17 |
| 4 | 15 | 57.94 |
| 5 | 21 | 54.77 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-173820, filed Sep. 11, 2017, which is hereby incorporated by reference herein in its entirety.

What is claimed is:

1. A zoom lens comprising a plurality of lens units, an interval between each pair of adjacent lens units being changed during zooming,
   wherein the plurality of lens units consist of, in order from an object side to an image side:
     a first lens unit having a positive refractive power;
     a second lens unit having a negative refractive power;
     a third lens unit having a negative refractive power; and
     a rear lens group including at least one lens unit,
   wherein an interval between the second lens unit and the third lens unit becomes larger at a telephoto end than at a wide angle end,
   wherein the third lens unit is moved during focusing, and
   wherein the following conditional expressions are satisfied:

$$-7.0 < f3/fw < -1.8;$$

$$0.36 < skw/fw < 1.0; \text{ and}$$

$$1.2 < f3/f2 < 5.0,$$

where f2 represents a focal length of the second lens unit, f3 represents a focal length of the third lens unit, "fw" represents a focal length of the zoom lens at the wide angle end, and "skw" represents a back focus at the wide angle end.

2. A zoom lens according to claim 1, wherein the following conditional expression is satisfied:

$$-5.0 < f2/fw < -1.1.$$

TABLE 1

|  | Conditional Expression | Example 1 | Example 2 | Example 3 | Example 4 | Example 5 |
| --- | --- | --- | --- | --- | --- | --- |
| Conditional Expression (1) | −7.0 < f3/fw < −1.8 | −2.74 | −2.63 | −2.73 | −4.05 | −1.97 |
| Conditional Expression (2) | 0.36 < skw/fw < 1.00 | 0.54 | 0.66 | 0.40 | 0.69 | 0.57 |
| Conditional Expression (3) | 1.2 < f3/f2 < 5.0 | 1.97 | 2.13 | 1.87 | 3.04 | 1.39 |
| Conditional Expression (4) | −5.0 < f2/fw < −1.1 | −1.39 | −1.23 | −1.46 | −1.33 | −1.42 |
| Conditional Expression (5) | 2.0 < f1/fw < 7.0 | 4.93 | 4.90 | 4.97 | 5.00 | 3.53 |
| Conditional Expression (6) | 1.1 < frw/fw < 4.0 | 1.23 | 1.26 | 1.21 | 1.29 | 1.96 |
| Conditional Expression (7) | 1.05 < L23t/L23w < 5.00 | 1.38 | 1.44 | 1.22 | 1.21 | 1.12 |
| Conditional Expression (8) | 0.2 < β3w < 0.8 | 0.48 | 0.50 | 0.46 | 0.58 | 0.35 |
| Conditional Expression (9) | $2.0 < (1-\beta 3t^2)\beta rt^2 < 5.0$ | 2.91 | 3.72 | 3.08 | 2.03 | 3.98 |
| Conditional Expression (10) | −3.0 < POw/fw < −1.2 | −2.07 | −2.33 | −2.05 | −1.75 | −1.72 |
| Conditional Expression (11) | −6.0 < m1/fw < −1.0 | −1.45 | −1.60 | −1.37 | −1.25 | −1.31 |

3. A zoom lens according to claim 1, wherein the following conditional expression is satisfied:

$$2.0 < f1/fw < 7.0,$$

where f1 represents a focal length of the first lens unit.

4. A zoom lens according to claim 1, wherein the following conditional expression is satisfied:

$$1.1 < frw/fw < 4.0,$$

where "frw" represents a combined focal length of the rear lens group at the wide angle end.

5. A zoom lens according to claim 1, wherein the following conditional expression is satisfied:

$$1.05 < L23t/L23w < 5.00,$$

where L23t represents an interval between the second lens unit and the third lens unit at the telephoto end, and L23w represents an interval between the second lens unit and the third lens unit at the wide angle end.

6. A zoom lens according to claim 1, wherein the following conditional expression is satisfied:

$$0.2 < \beta3w < 0.8,$$

where $\beta3w$ represents a lateral magnification of the third lens unit at the wide angle end.

7. A zoom lens according to claim 1, wherein the following conditional expression is satisfied:

$$2.0 < (1-\beta3t^2)\beta rt^2 < 5.0,$$

where $\beta3t$ represents a lateral magnification of the third lens unit at the telephoto end, and "$\beta rt$" represents a combined lateral magnification of the rear lens group at the telephoto end.

8. A zoom lens according to claim 1, wherein the following conditional expression is satisfied:

$$-3.0 < POw/fw < -1.2,$$

where POw represents a distance from the image plane to an exit pupil on an optical axis at the wide angle end.

9. A zoom lens according to claim 1, wherein the following conditional expression is satisfied:

$$-6.0 < m1/fw < -1.0,$$

where m1 represents a movement amount of the first lens unit during zooming from the wide angle end to the telephoto end, the movement amount having a negative sign when the first lens unit is moved so as to be located closer to the object side at the telephoto end than at the wide angle end, and having a positive sign when the first lens unit is moved so as to be located closer to the image side at the telephoto end than at the wide angle end.

10. A zoom lens according to claim 1, wherein the third lens unit consists of two or less lenses.

11. A zoom lens according to claim 1, wherein the rear lens group consists of, in order from the object side to the image side, a fourth lens unit having a positive refractive power and a fifth lens unit having a positive refractive power.

12. A zoom lens according to claim 1, wherein the rear lens group consists of, in order from the object side to the image side, a fourth lens unit having a positive refractive power, a fifth lens unit having a negative refractive power, a sixth lens unit having a positive refractive power, and a seventh lens unit having a negative refractive power.

13. A zoom lens according to claim 1, wherein the rear lens group consists of, in order from the object side to the image side, a fourth lens unit having a positive refractive power, a fifth lens unit having a positive refractive power, and a sixth lens unit having a negative refractive power.

14. An image pickup apparatus comprising:
a zoom lens; and
an image pickup element configured to receive light of an image formed by the zoom lens,
wherein the zoom lens includes a plurality of lens units, an interval between each pair of adjacent lens units being changed during zooming,
wherein the plurality of lens units consist of, in order from an object side to an image side:
a first lens unit having a positive refractive power;
a second lens unit having a negative refractive power;
a third lens unit having a negative refractive power; and
a rear lens group including at least one lens unit,
wherein an interval between the second lens unit and the third lens unit becomes larger at a telephoto end than at a wide angle end,
wherein the third lens unit is moved during focusing, and
wherein the following conditional expressions are satisfied:

$$-7.0 < f3/fw < -1.8;$$

$$0.36 < skw/fw < 1.0; \text{ and}$$

$$1.2 < f3/f2 < 5.0,$$

where f2 represents a focal length of the second lens unit, f3 represents a focal length of the third lens unit, "fw" represents a focal length of the zoom lens at the wide angle end, and "skw" represents a back focus at the wide angle end.

* * * * *